Nov. 11, 1924.                          1,514,694
M. W. GREER
FLYING MACHINE
Filed Feb. 25 1920    22 Sheets-Sheet 1

INVENTOR
Medorem W. Greer
BY
Frank Keifer
ATTORNEY

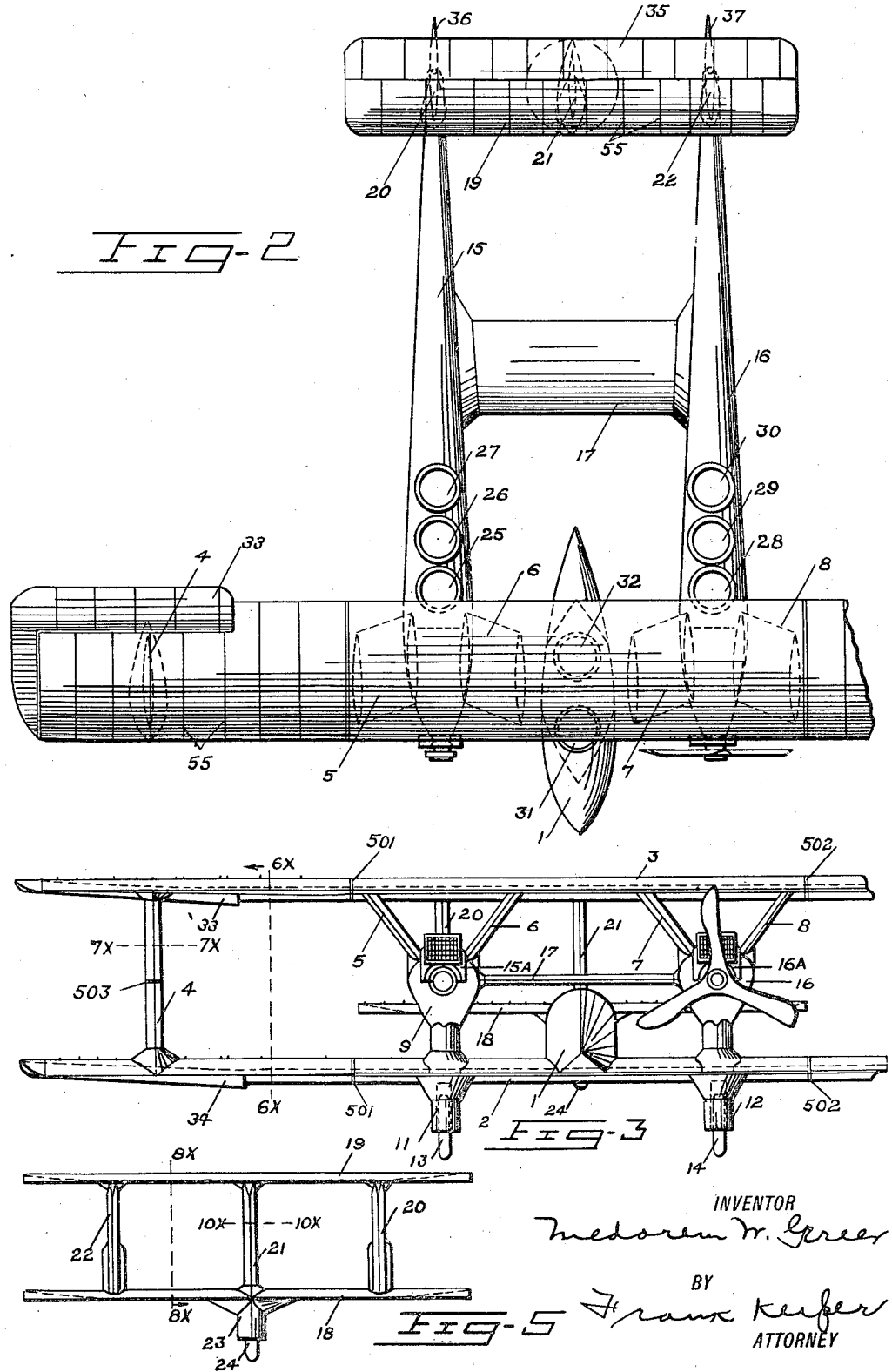

Nov. 11, 1924.
M. W. GREER
1,514,694
FLYING MACHINE
Filed Feb. 25, 1920
22 Sheets-Sheet 3
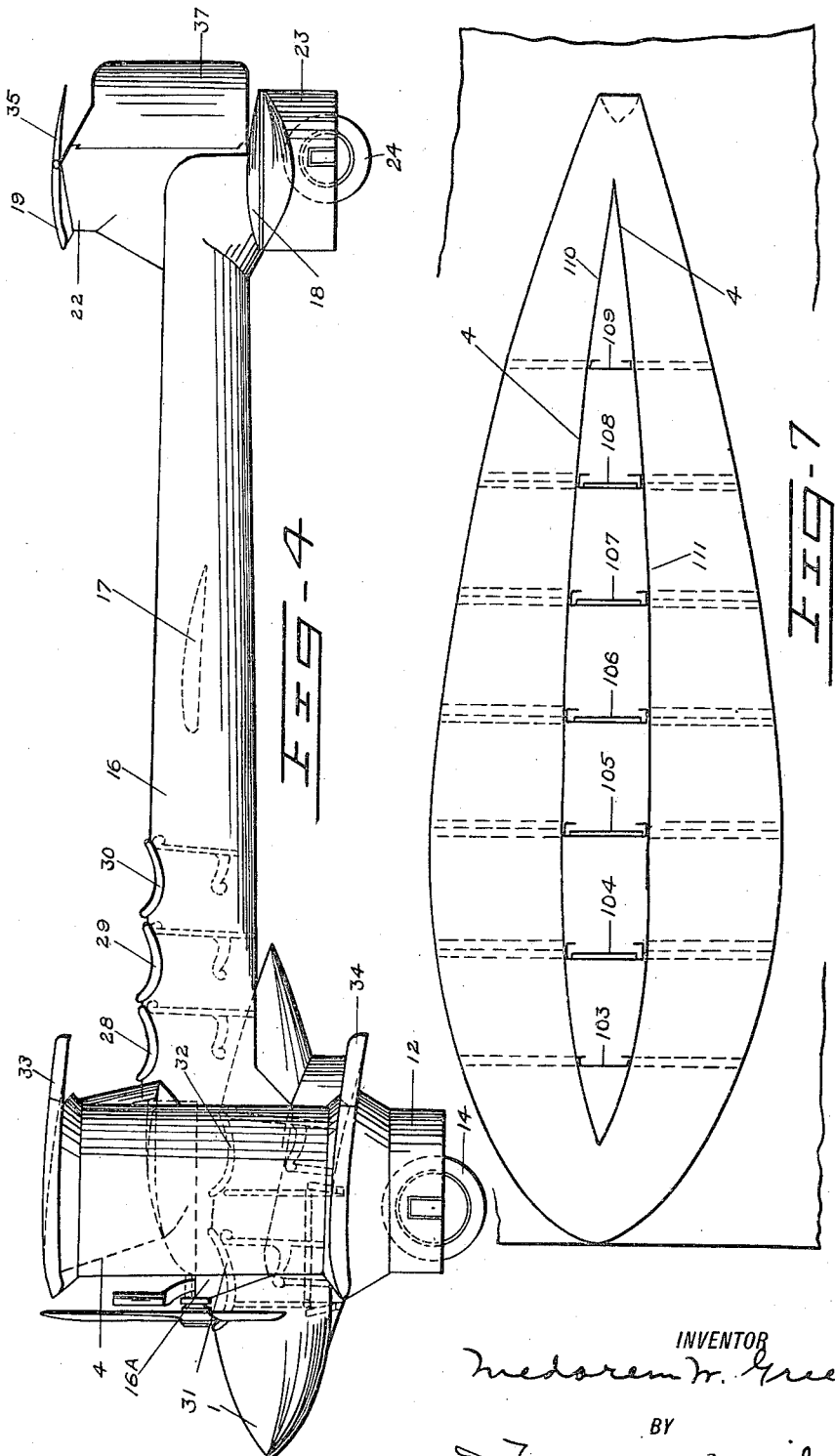

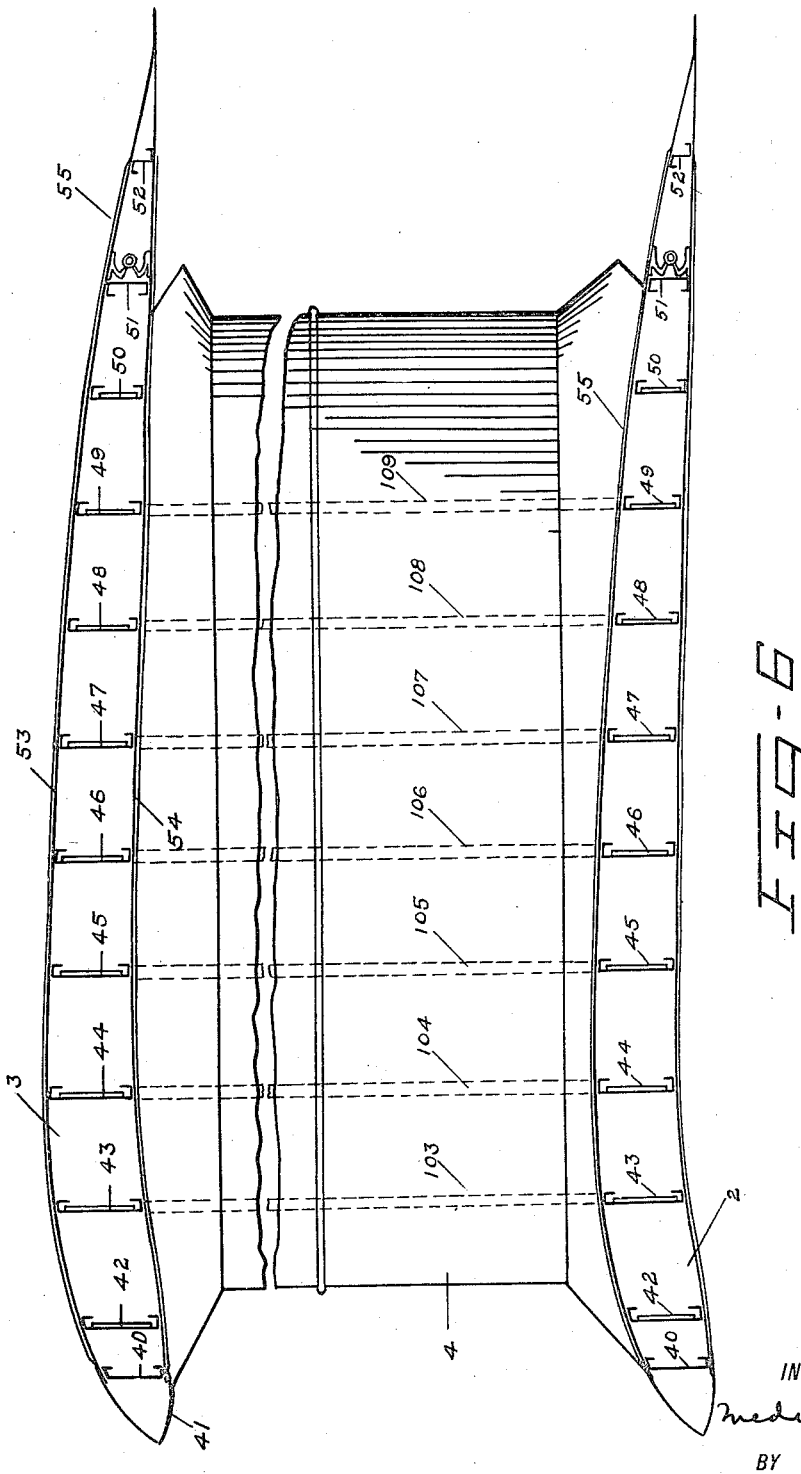

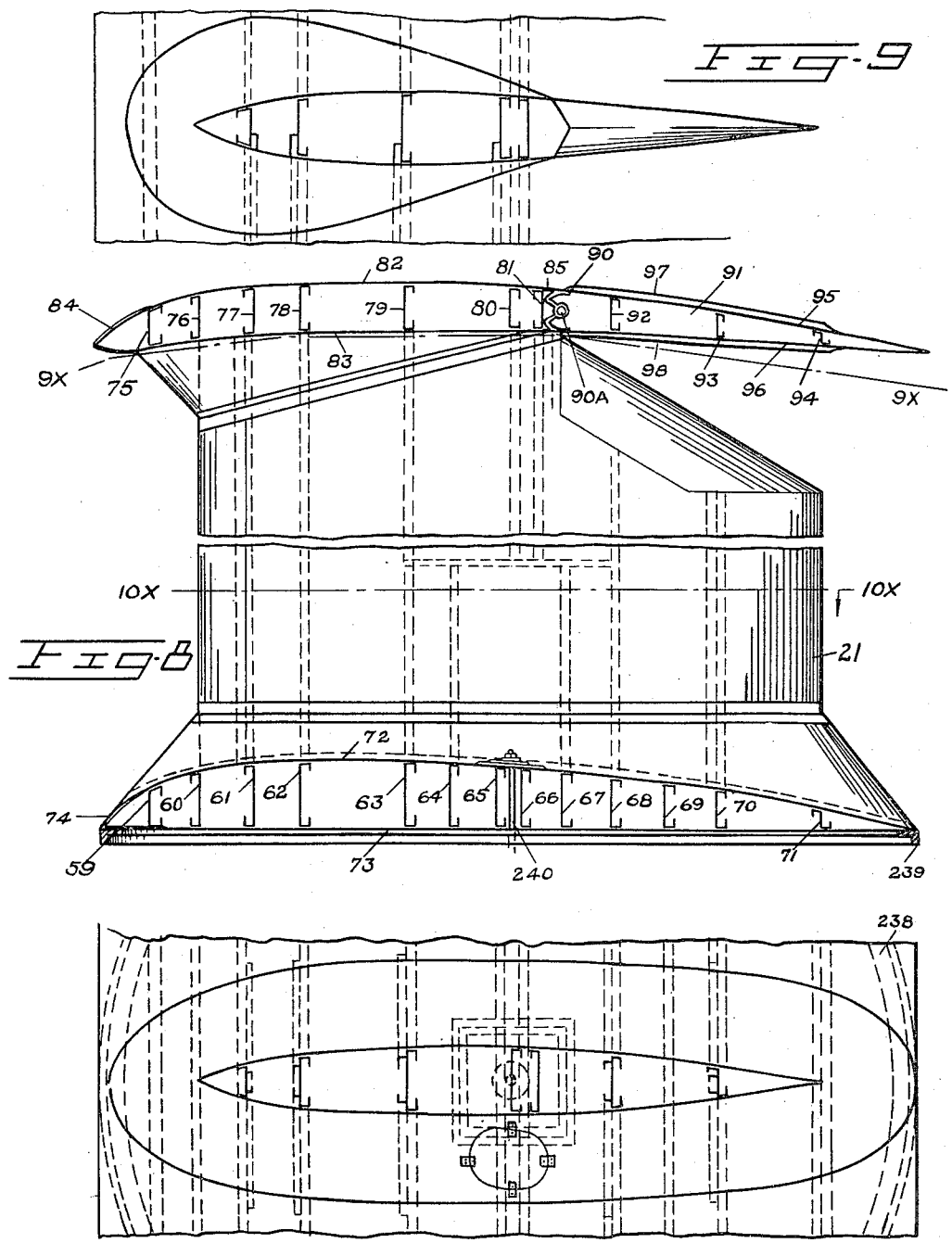

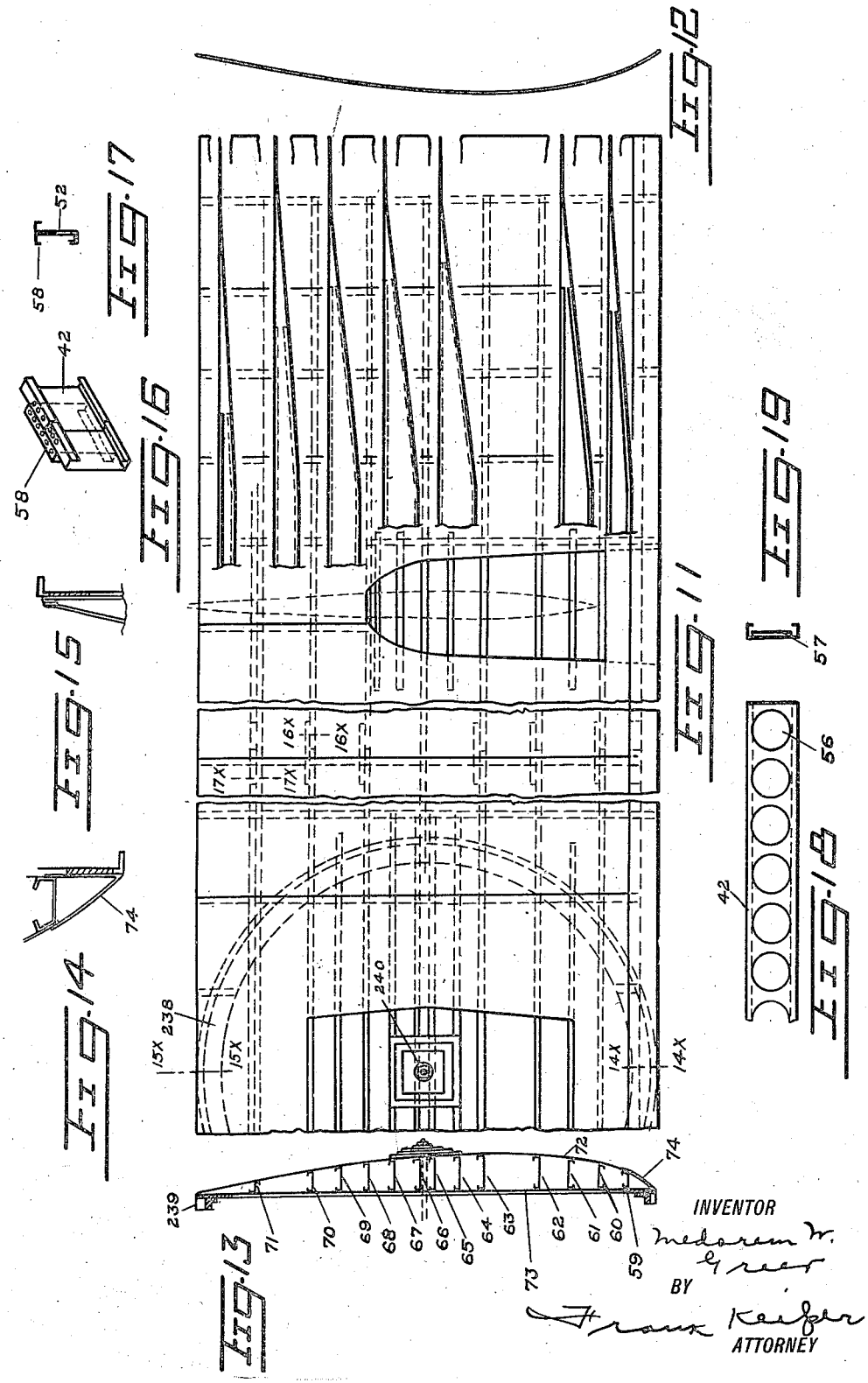

Nov. 11, 1924.
M. W. GREER
FLYING MACHINE
Filed Feb. 25, 1920     22 Sheets-Sheet 7
1,514,694
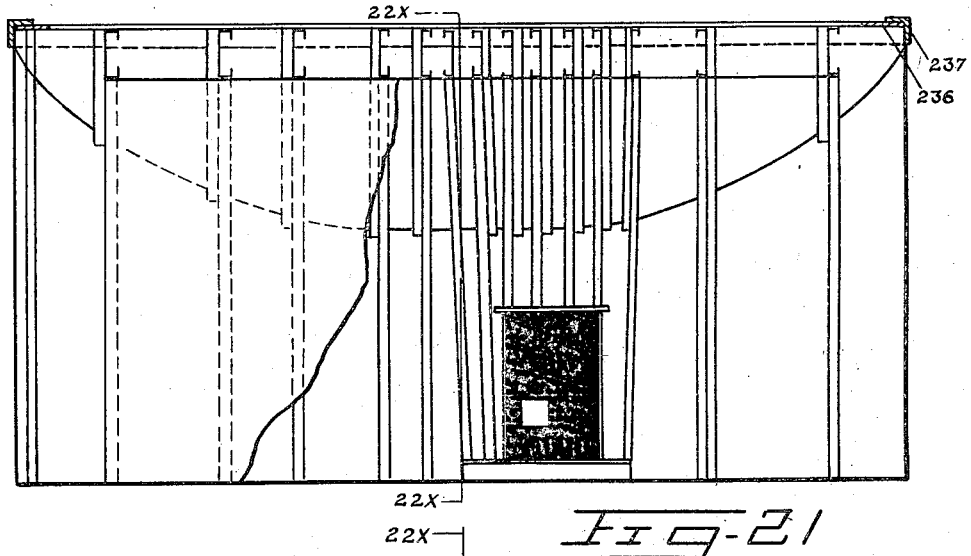
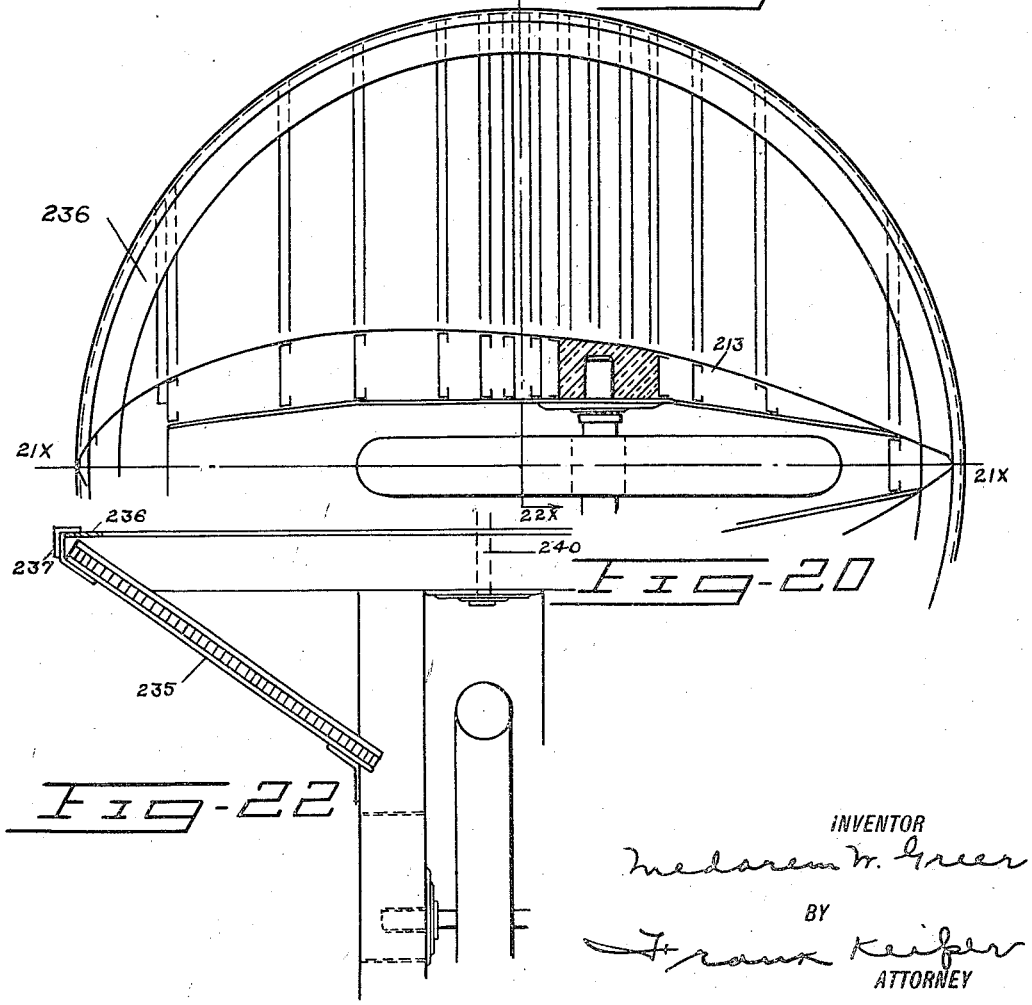

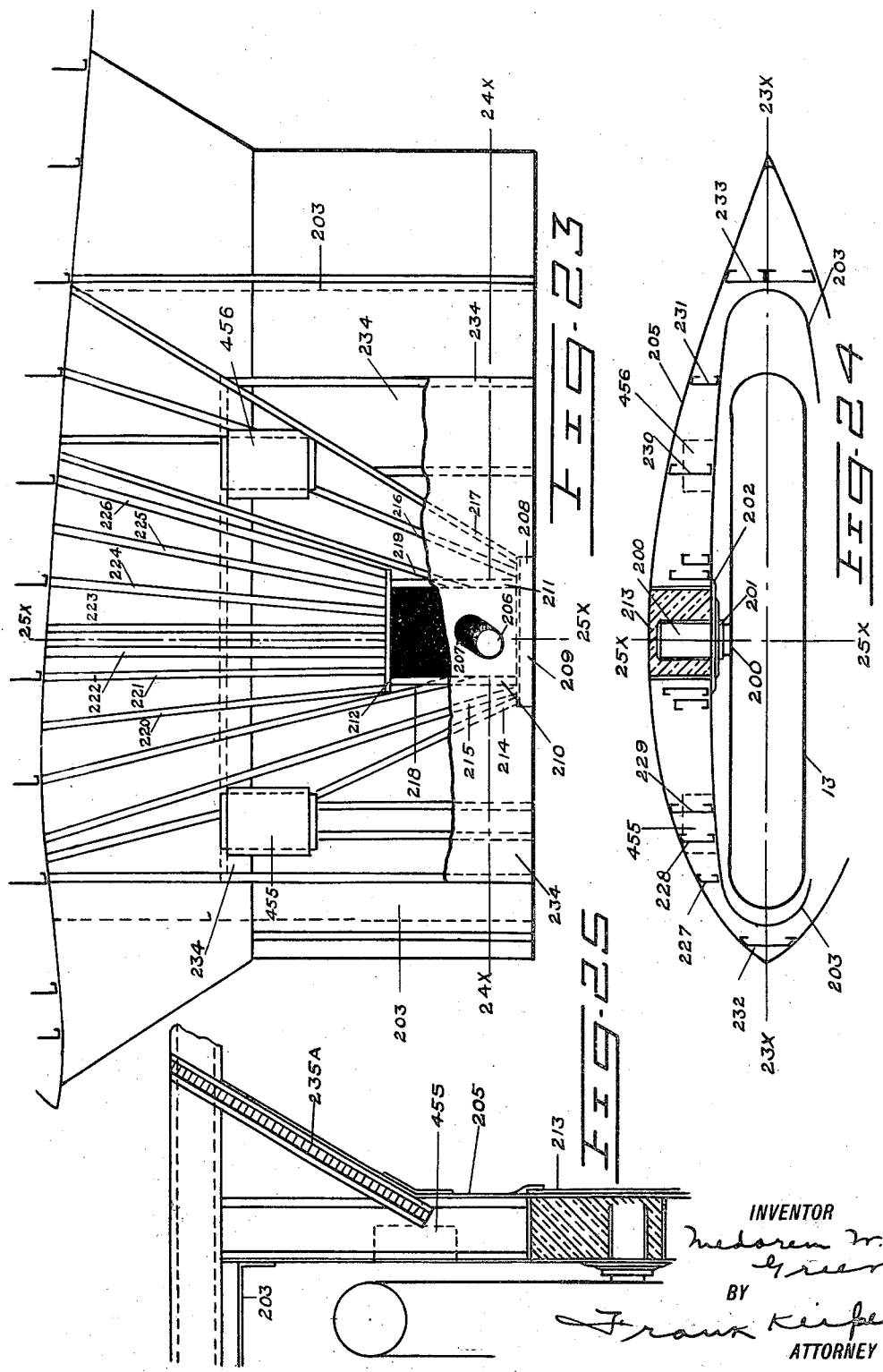

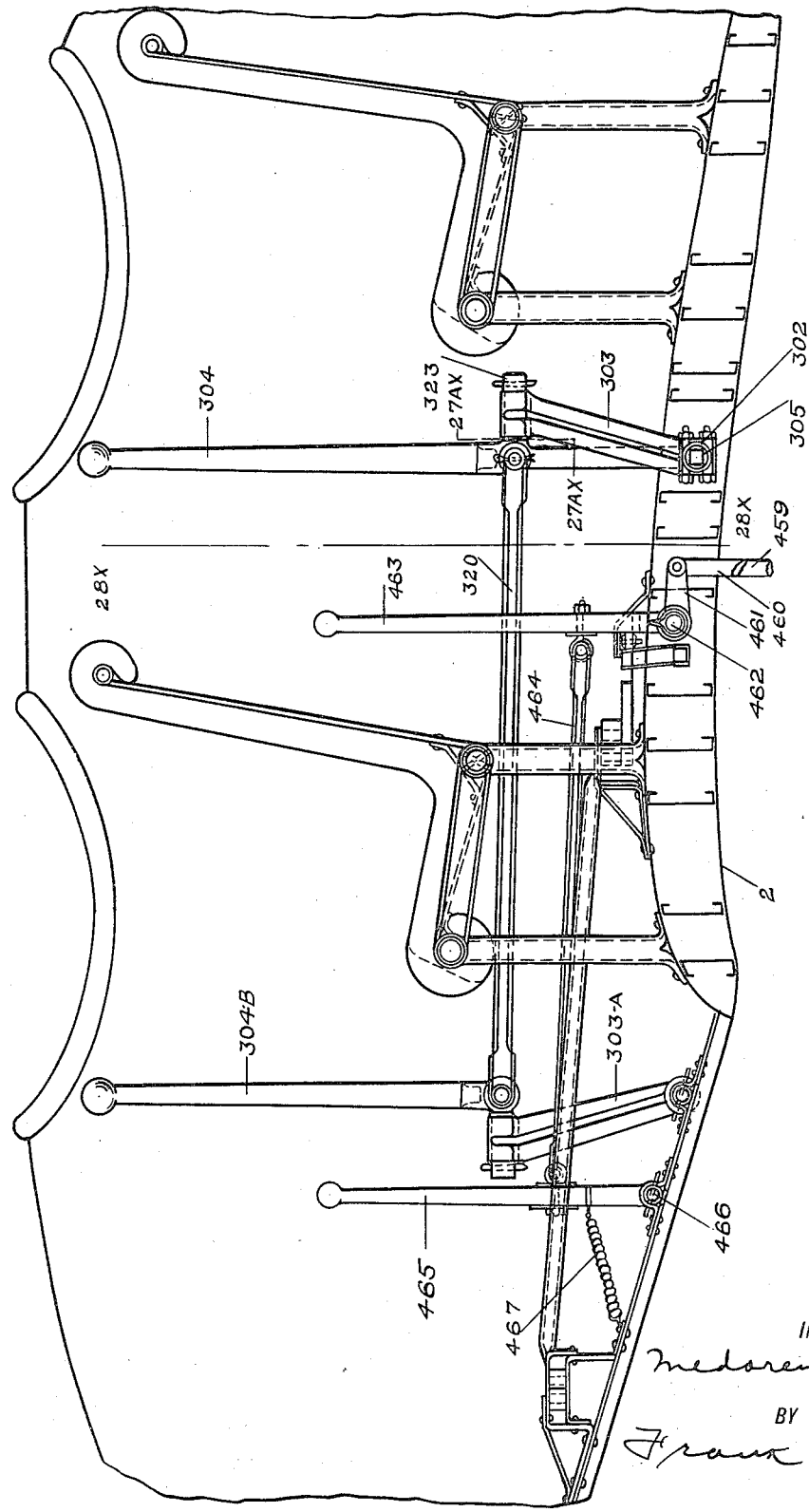

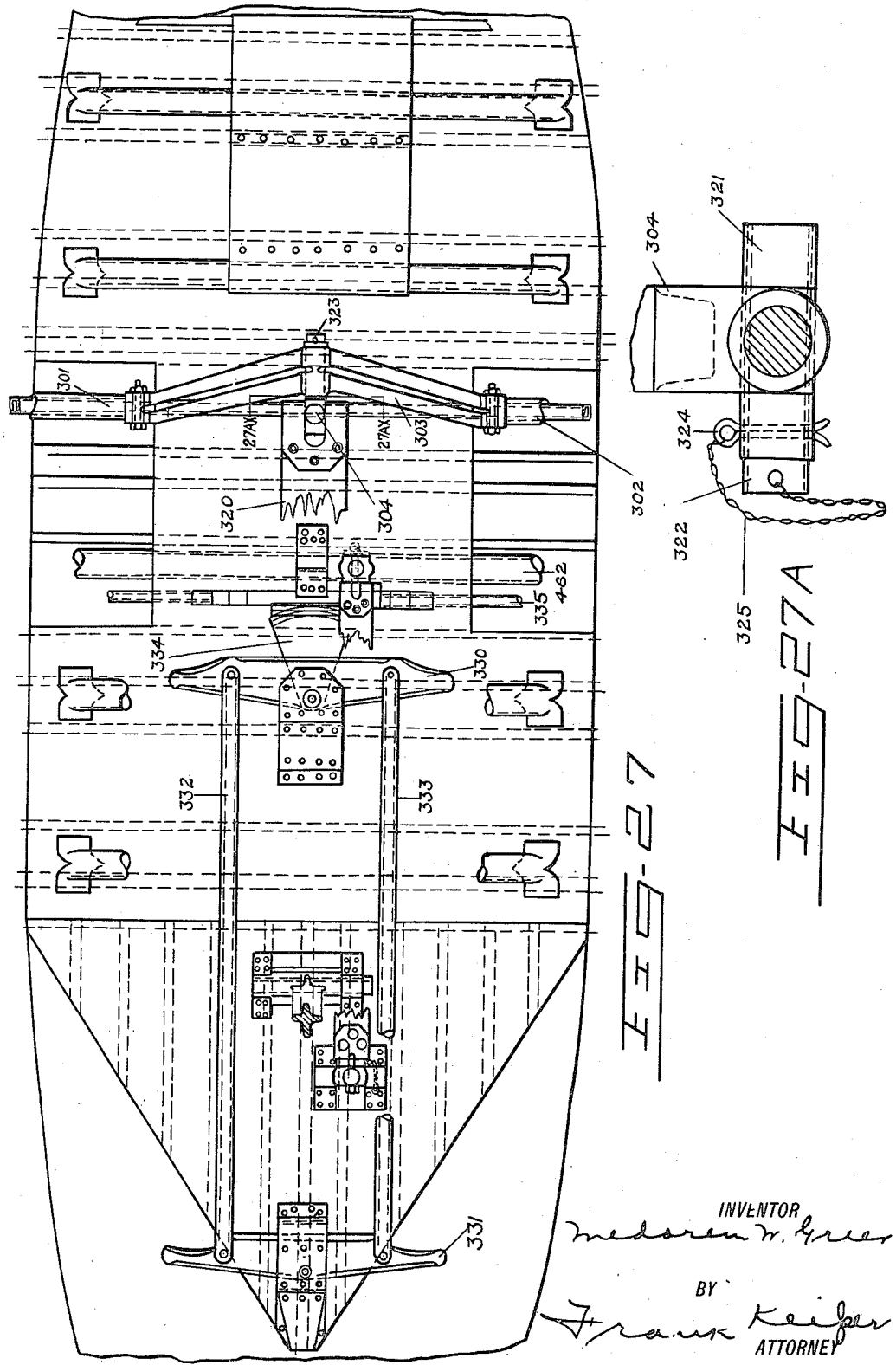

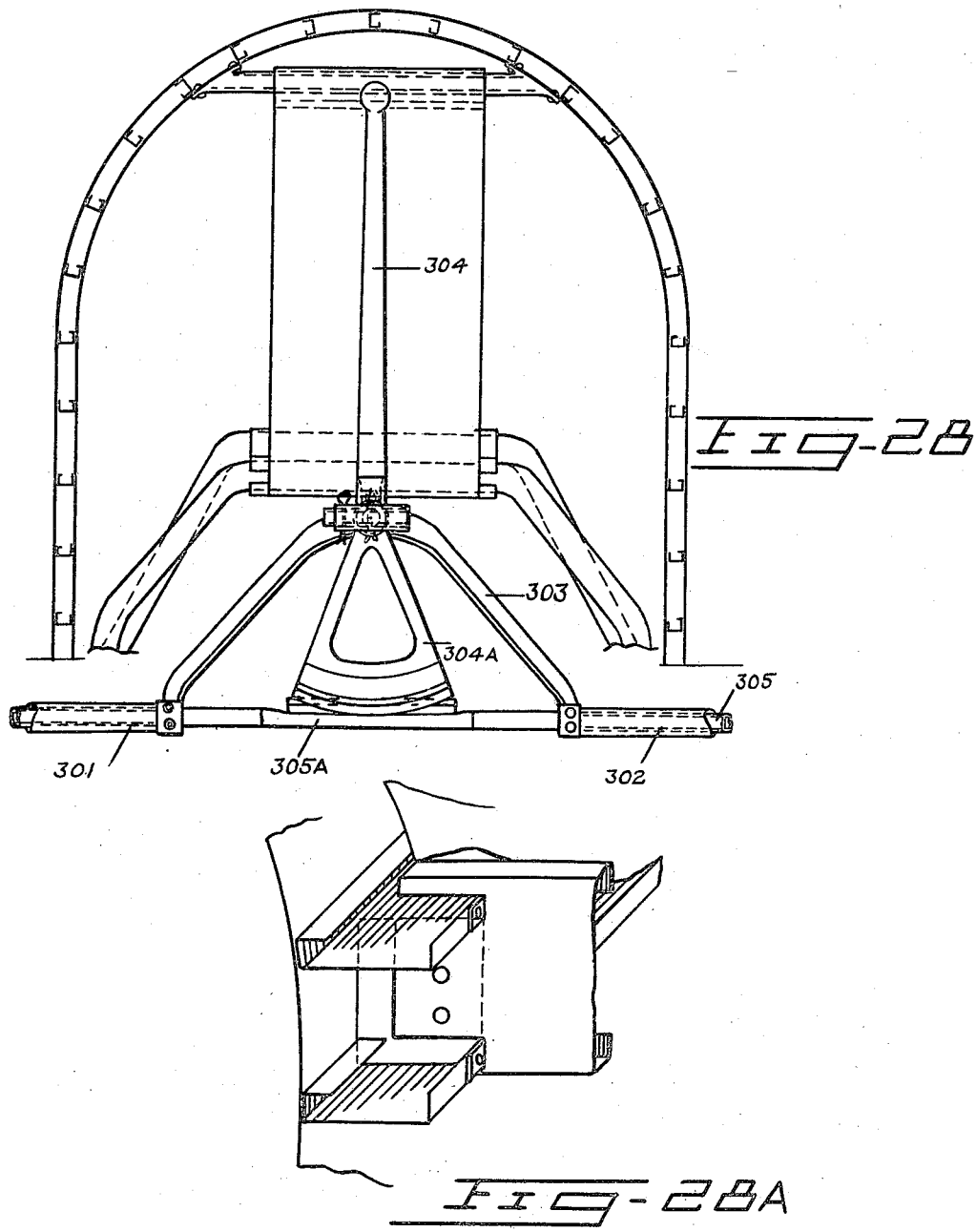

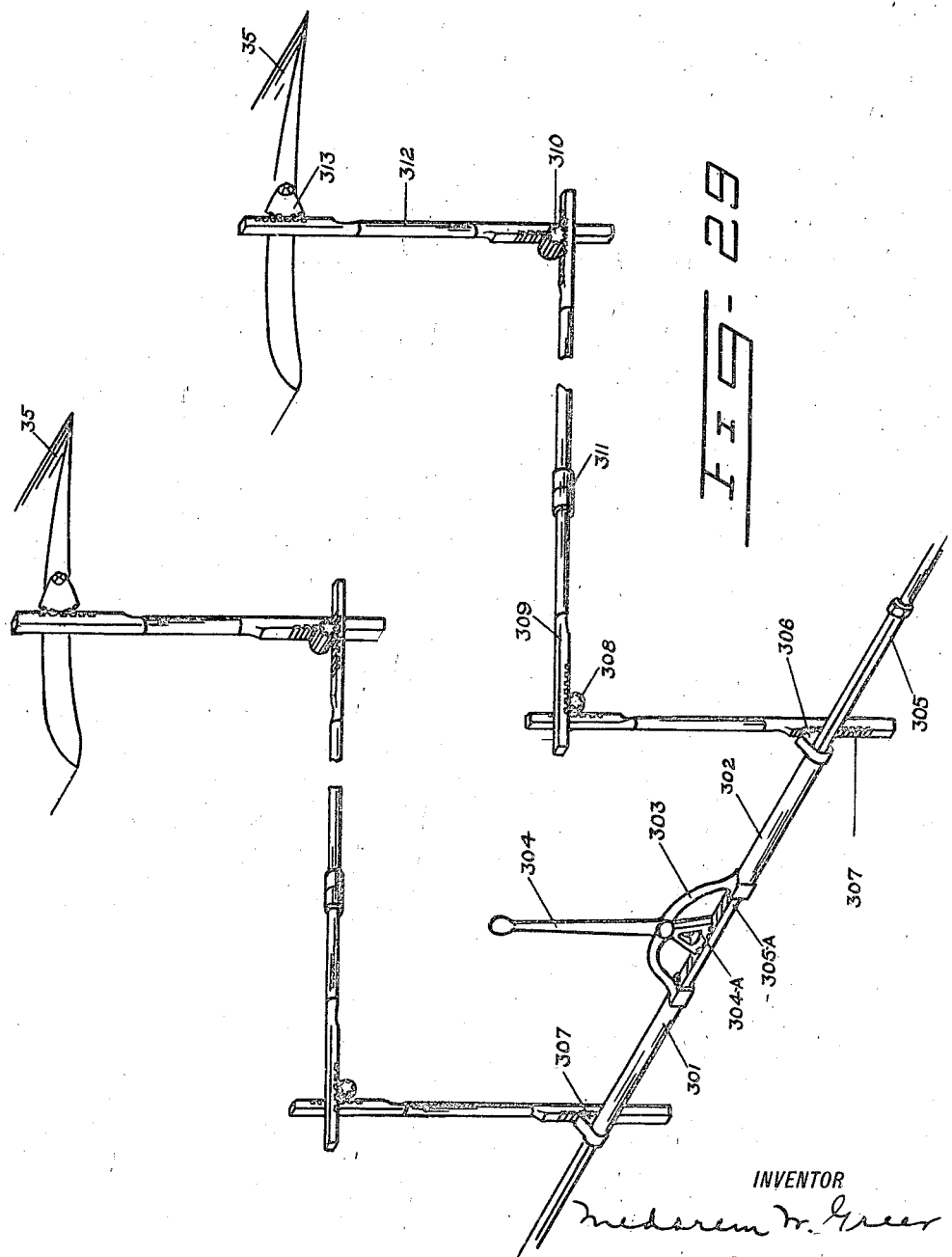

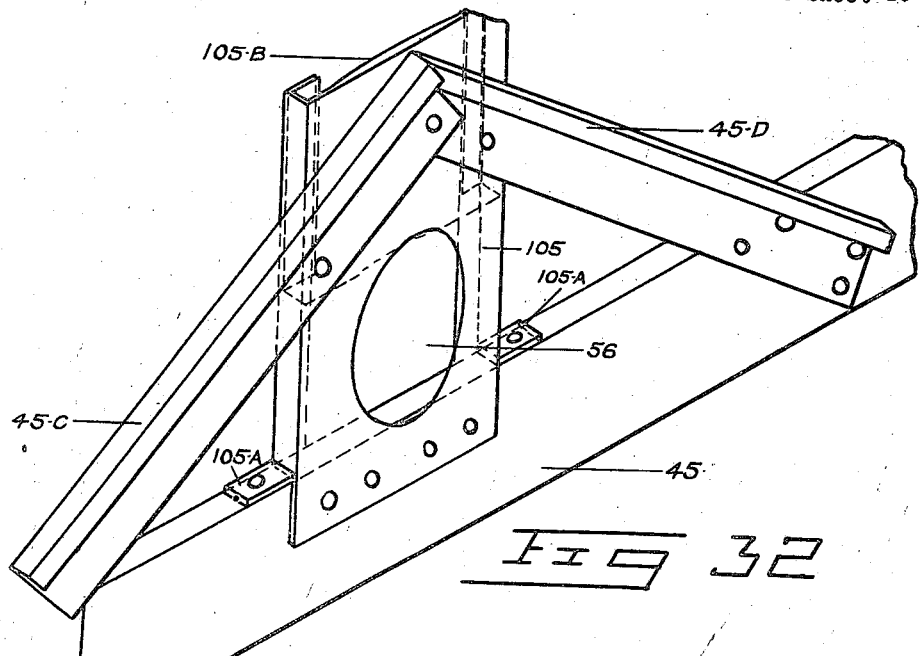
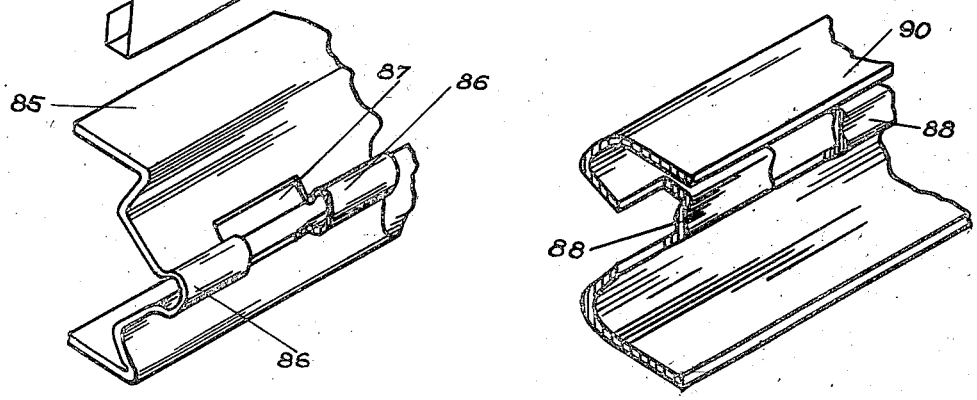
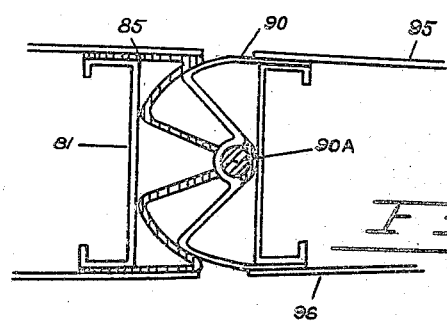

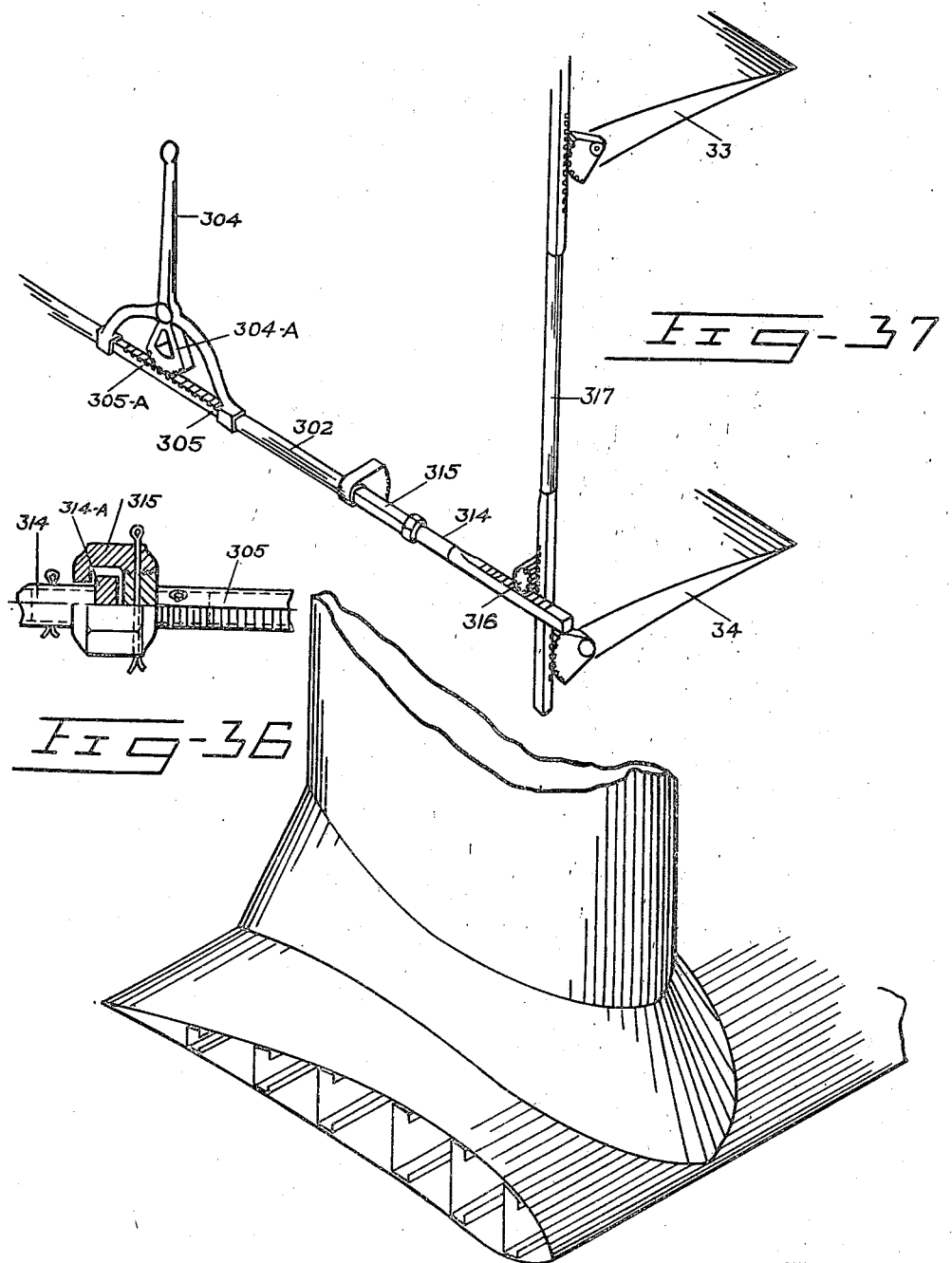

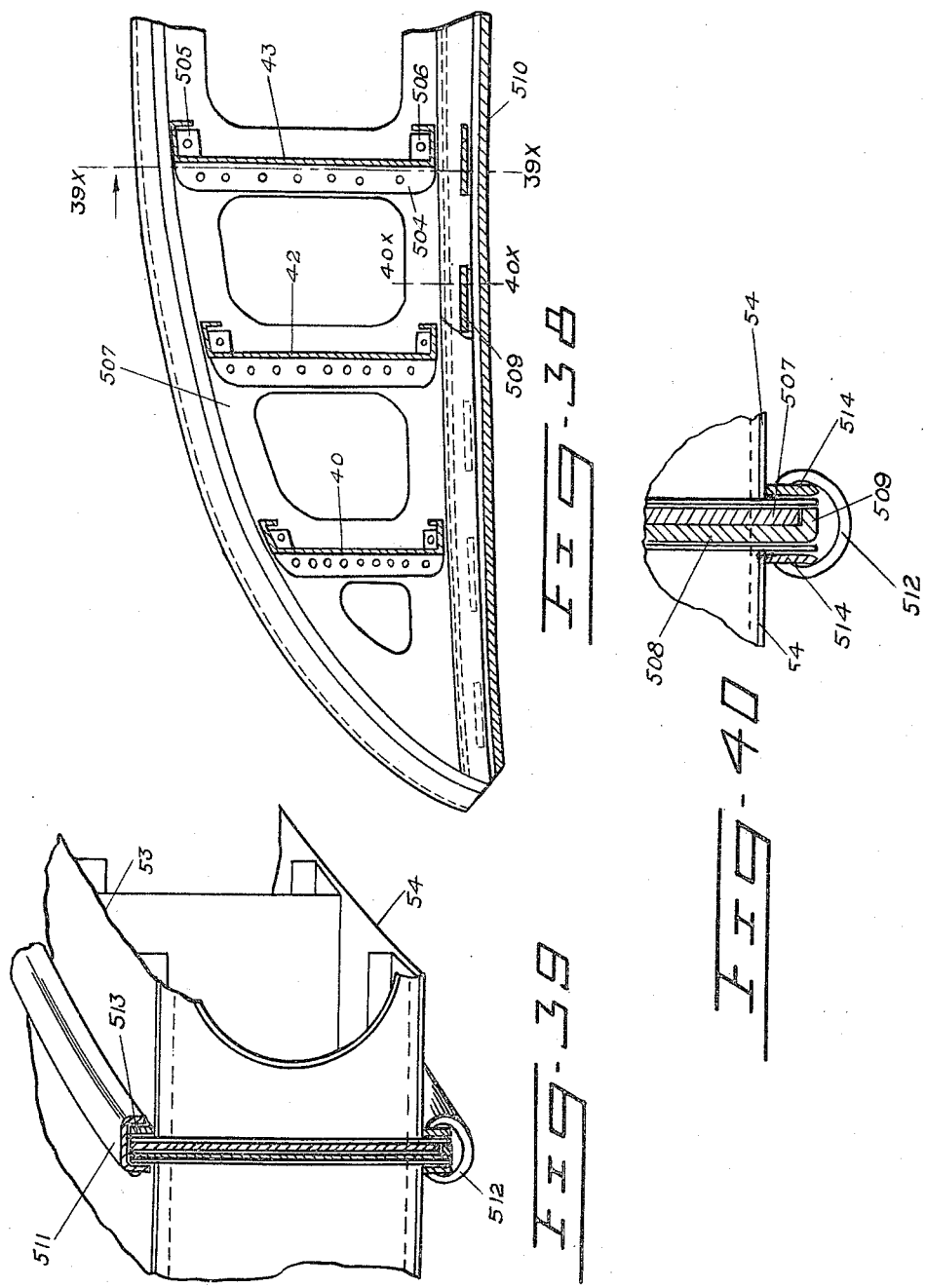

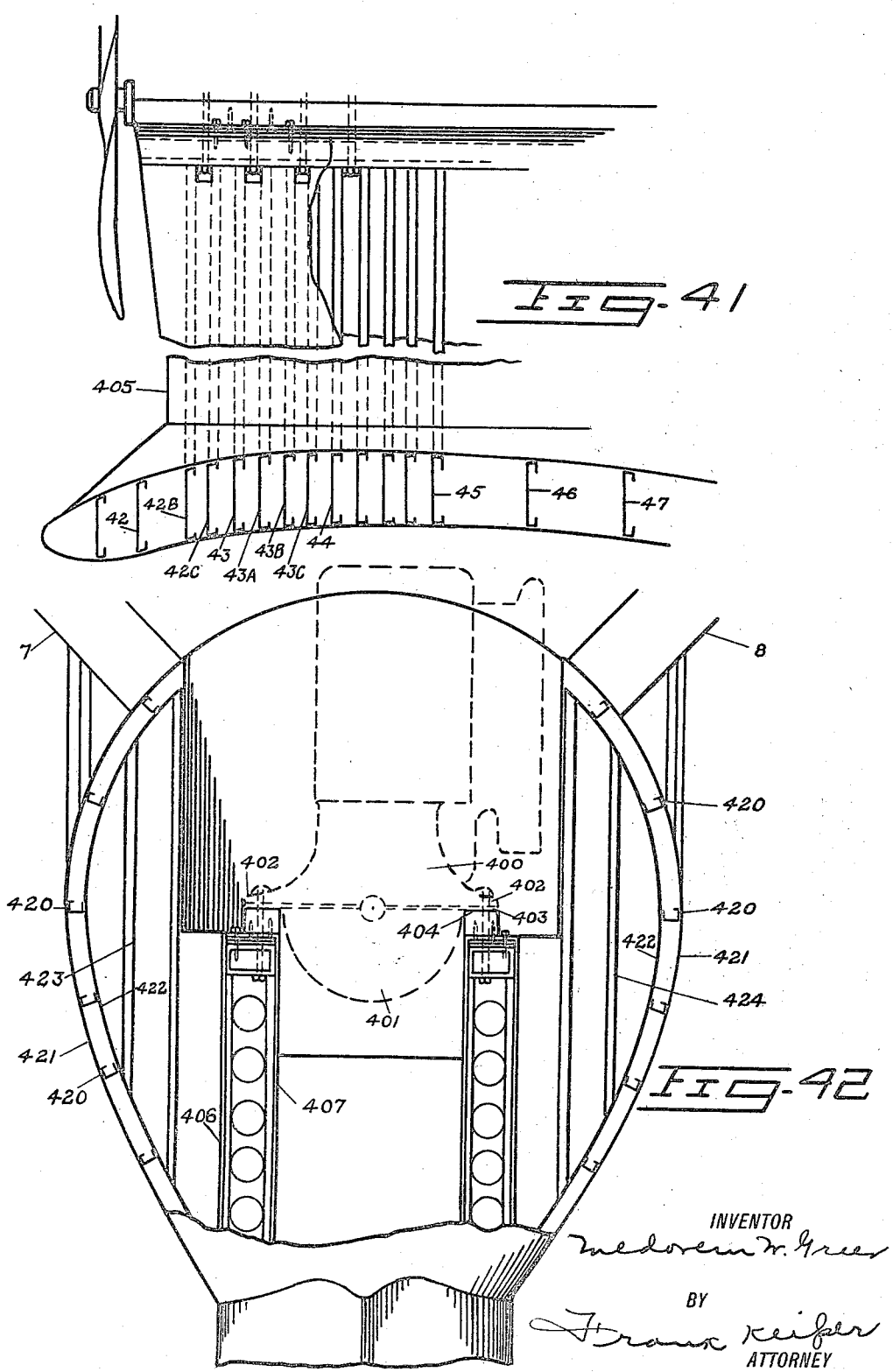

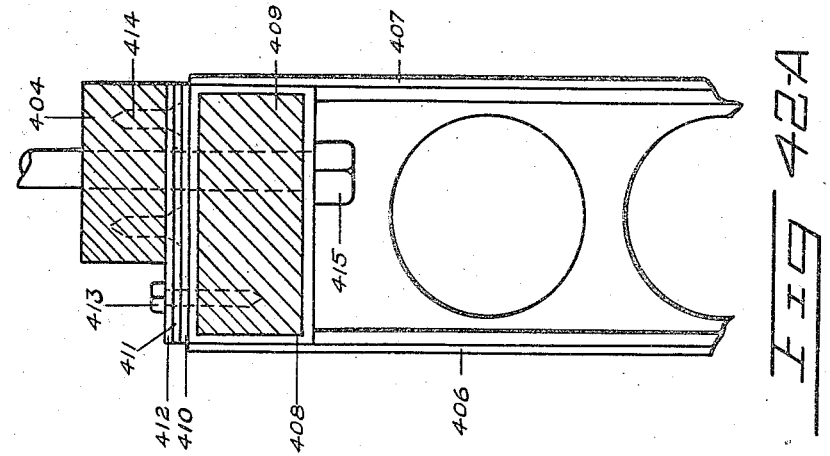
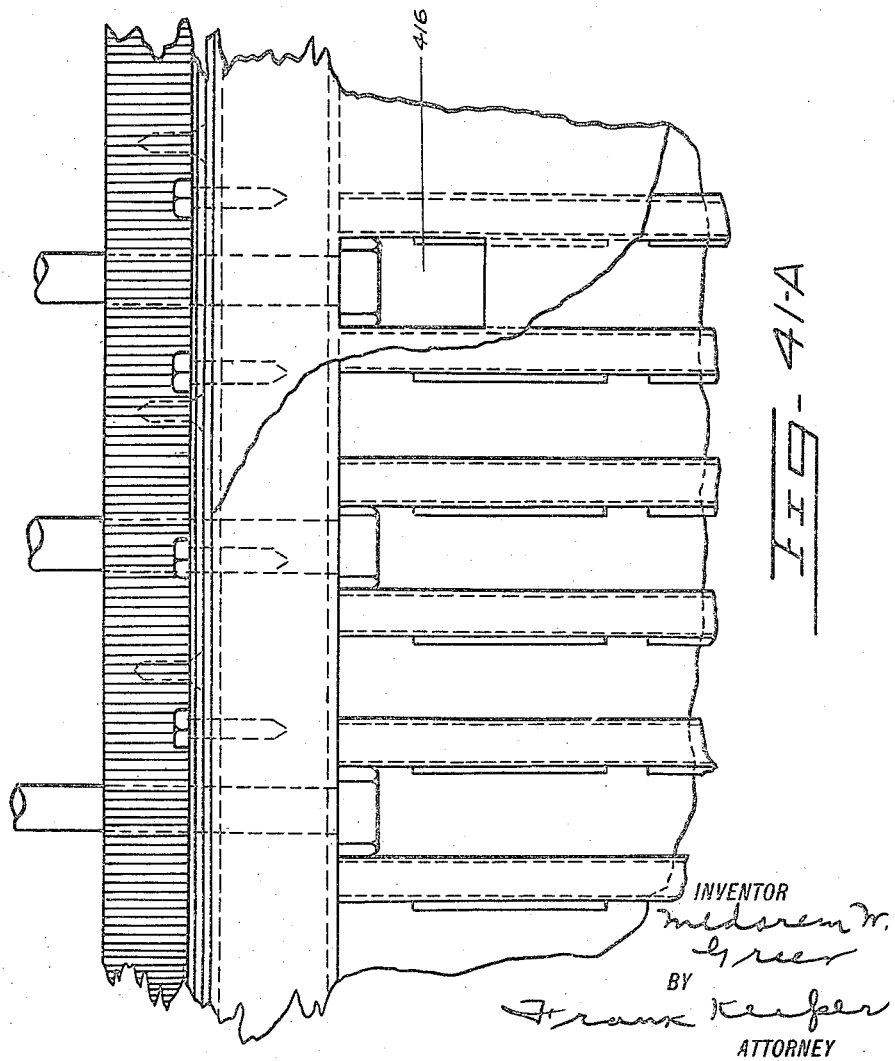

Nov. 11, 1924.
M. W. GREER
FLYING MACHINE
Filed Feb. 25, 1920     22 Sheets-Sheet 19
1,514,694
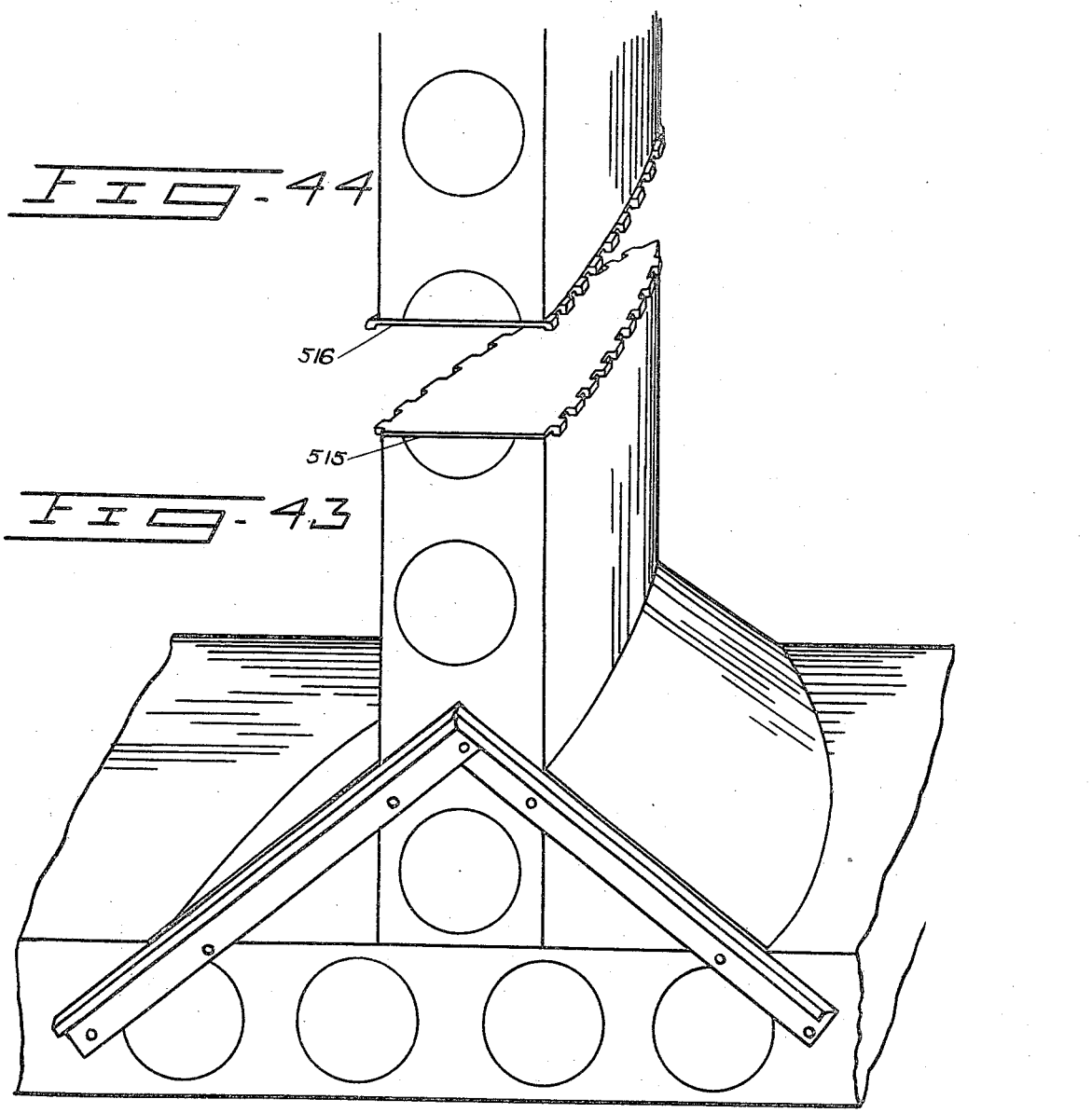

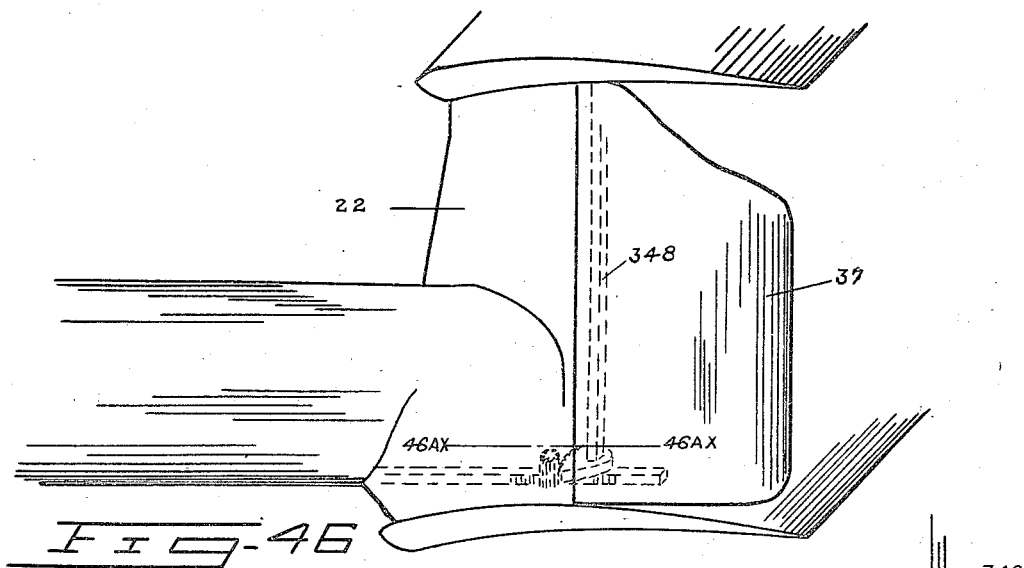
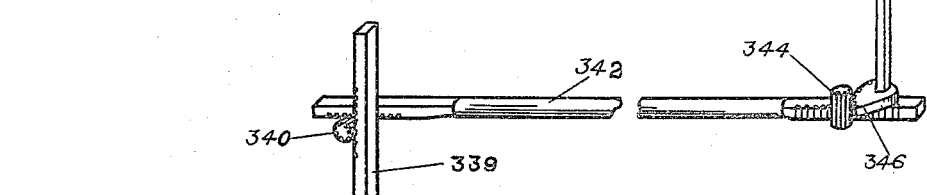
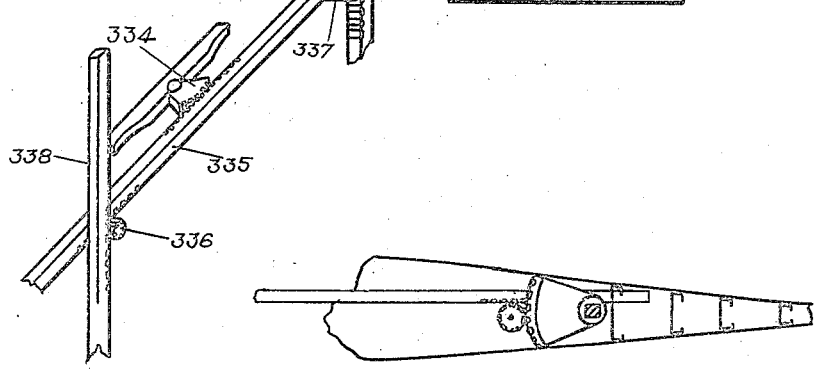

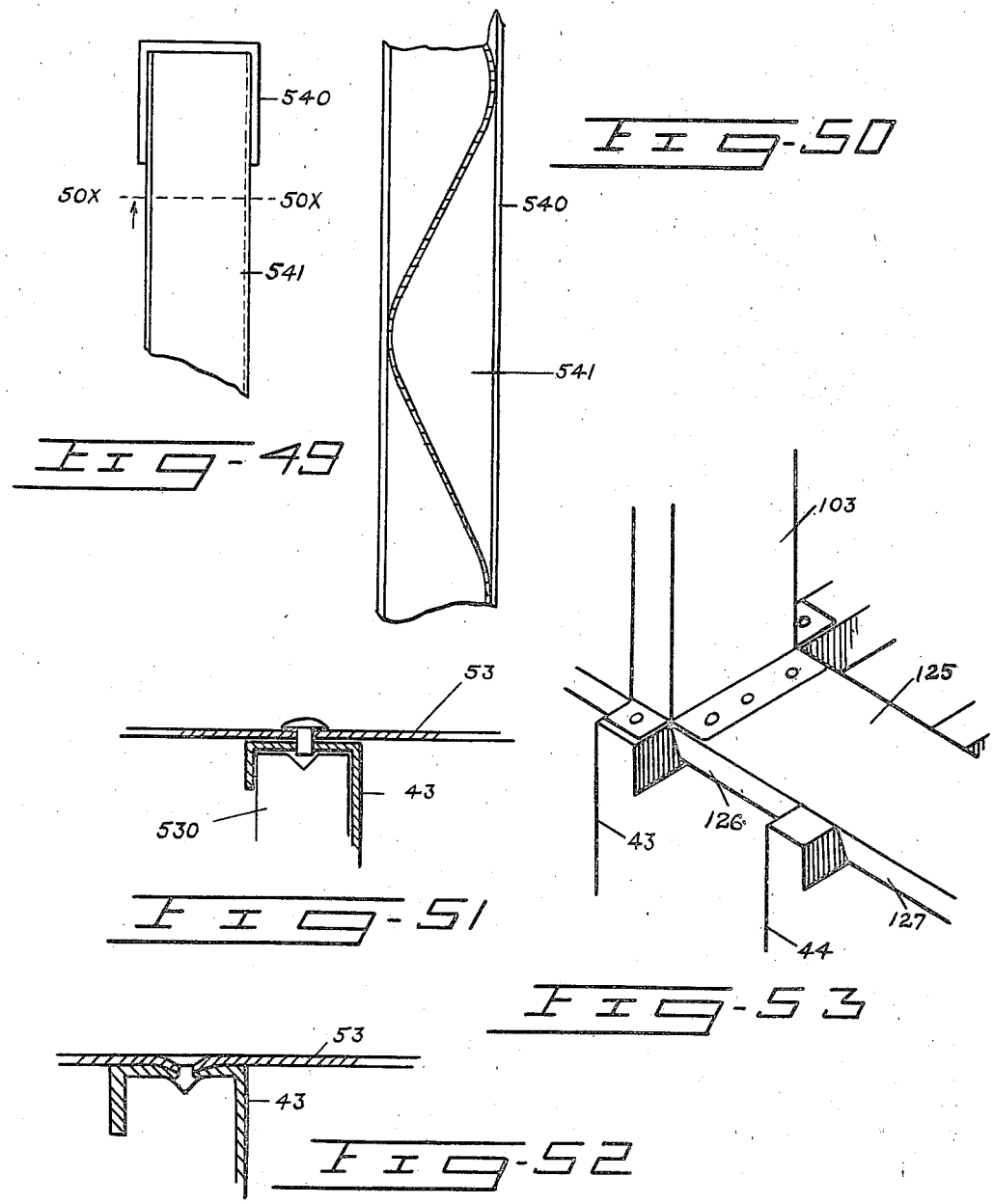

Patented Nov. 11, 1924.

1,514,694

UNITED STATES PATENT OFFICE.

MEDOREM W. GREER, OF NEW YORK, N. Y., ASSIGNOR TO ALL METAL AIRPLANE COMPANY, INC., OF NEW YORK, N. Y., A CORPORATION OF NEW YORK.

FLYING MACHINE.

Application filed February 25, 1920. Serial No. 361,302.

*To all whom it may concern:*

Be it known that I, MEDOREM W. GREER, a citizen of the United States, residing at New York, in the county of New York and State of New York, have invented certain new and useful Improvements in Flying Machines, of which the following is a specification.

The object of this invention is to provide a new and improved form of flying machine of all metal construction and the method of building the same.

This and other objects of the invention will be illustrated in the drawings, described in the specification and pointed out in the claims at the end thereof.

In the drawings,

Figure 2 is a top plan view of the machine, partly broken away on one side.

Figure 3 is a front elevation of the machine partly broken away on one side.

Figure 4 is a side elevation of the machine.

Figure 5 is a rear elevation of the tail of the machine.

Figure 6 is a vertical section on the line $6^x$—$6^x$ of Figure 3.

Figure 7 is a cross section on the line $7^x$—$7^x$ of Figure 3.

Figure 8 is a vertical section thru the tail set on the line $8^x$—$8^x$ of Figure 5, looking in the direction of the arrow and showing the center strut in elevation.

Figure 9 is a top plan view of the center strut of the tail set, the top wing being removed, on the line $9^x$—$9^x$ of Figure 8, following the lower surface of the top wing.

Figure 10 is a section on the line $10^x$—$10^x$ of Figures 5 and 8, looking down, the section being taken thru the center strut of the tail set.

Figure 11 is a top plan view of the right hand portion of the lower tail wing looking from the front of Figures 2 and 4. The ends of seven beams are shown sketched thereon in elevation.

Figure 12 is an end elevation of the right hand end of Figure 11.

Figure 13 is a sectional elevation of the left hand end of Figure 11.

Figure 14 is a section on the line $14^x$—$14^x$ of Figure 11.

Figure 15 is a section on the line $15^x$—$15^x$ of Figure 11.

Figure 16 is a perspective of a section on the line $16^x$—$16^x$ of Figure 11 showing a butt joint splice in a standard beam.

Figure 17 is a section on the line $17^x$—$17^x$ of Figure 11.

Figure 18 is a side elevation of a standard beam.

Figure 19 is an end elevation of the standard beam shown in Figure 18.

Figure 20 is a top plan view of the wheel housing and turn table of the trailing wheel.

Figure 21 is a section on the line $21^x$—$21^x$ of Figure 20 with the lining partly broken away, the wheel and axle being omitted.

Figure 22 is a section on the line $22^x$—$22^x$ of Figures 20 and 21.

Figure 23 is a vertical section thru one of the main wheel housings, the section being taken on the line $23^x$—$23^x$ of Figure 24, the wheel and axle being omitted and the lining being partly broken away.

Figure 24 is a horizontal section thru the wheel housing, the section being taken on the line $24^x$—$24^x$ of Figure 23, showing the wheel and fittings.

Figure 25 is a vertical section on the line $25^x$—$25^x$ of Figures 23 and 24, showing the wheel and fittings.

Figure 26 is a side elevation of the control mechanism contained in the nacelle or dory showing the relation between them.

Figure 27 is a top plan view of the control mechanism shown in side elevation in Figure 26, the front and the control connecting bar and brake bar being partly broken away, the Joy-stick and yoke and front chair being omitted.

Figure $27^A$ is a detail view of the coupling between the dual control bar and the Joy-stick fitting.

Figure 28 is a section on the line $28^x$—$28^x$ of Figure 26 looking in the direction of the arrow.

Figure $28^A$ is a perspective view of the joint between the body and the beam of the bar wing 17.

Figure 29 is a diagrammatic perspective view of the gearing for transmitting the movement of the Joy-stick to the elevator in the tail.

Figure 30 is a perspective view of the portion of the hinge that is on the wing.

Figure 31 is a perspective view of the portion of the hinge that is on the ailerons and elevators.

Figure 31^A is a sectional view of the hinge and parts associated therewith.

Figure 32 is a perspective view of the braces between a wing beam and strut beam.

Figure 32^A is an end elevation of the reinforce shown in Figure 32.

Figure 33:
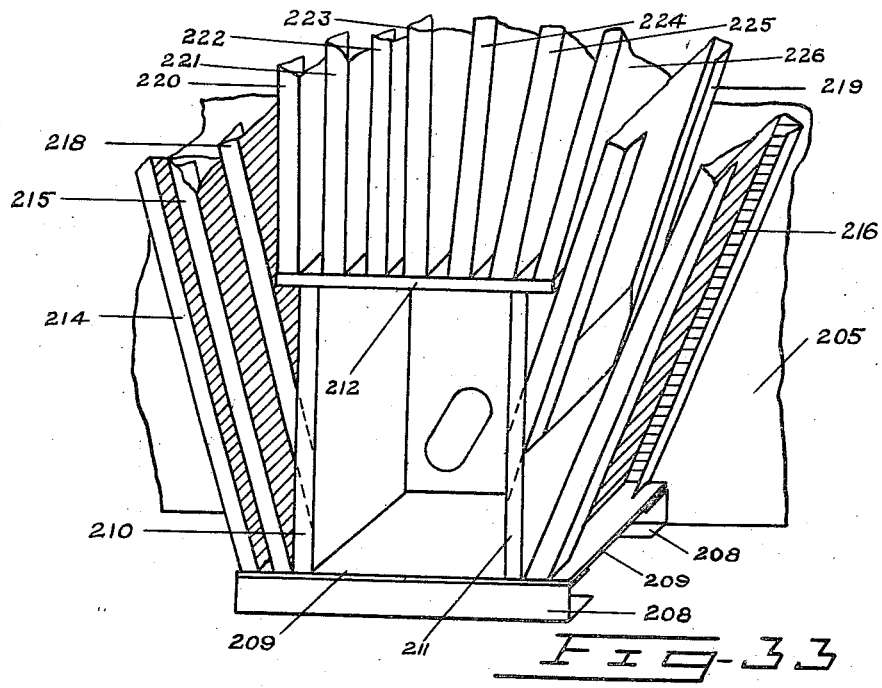

Figure 33 is a perspective view of a bearing box for one of the supporting wheels with the outer cover removed.

Figure 34:
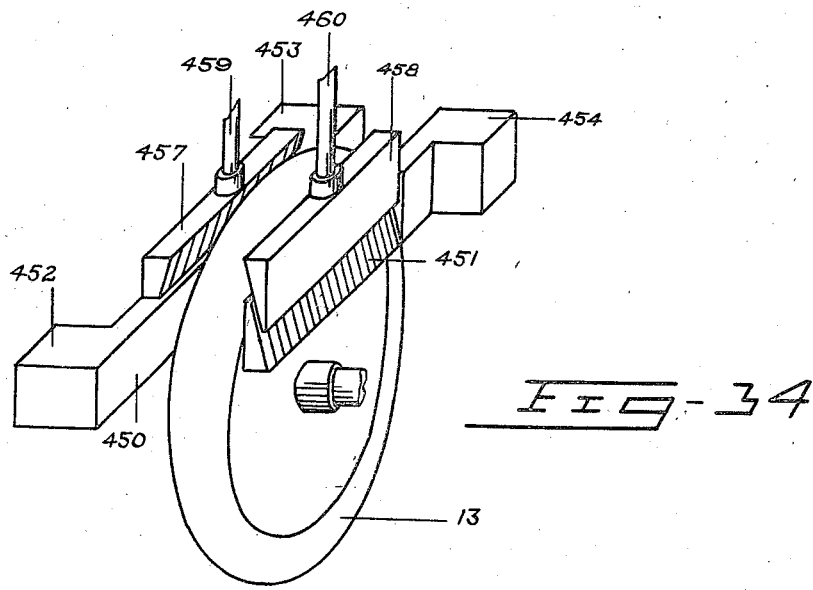

Figure 34 is a perspective view of the brake mechanism.

Figure 35 is a perspective view of a portion of one of the lower wings and a portion of the strut.

Figure 36 is a detail view of a swivel joint in the aileron control rods.

Figure 37 is a diagrammatic view of the aileron controls.

Figure 38 is an end elevation of a wing at a knock-down joint, the wing being partly broken away, the leading edge being shown and one of the beams being shown in section.

Figure 39 is a perspective, sectional view of the wing and knock-down joint, the section being taken on the line 39^x—39^x of Figure 38.

Figure 40 is a section on the line 40^x—40^x of Figure 38, showing the interlocking joint and the lock rod for binding the joint together.

Figure 41 is a side elevation of the engine foundation.

Figure 41^A is an enlarged view of a portion of the foundation shown in Figure 41.

Figure 42 is a transverse section thru the body showing an end elevation of the engine foundation and engine.

Figure 42^A is an enlarged view of a portion of the foundation shown in Figure 42.

Figures 43 and 44 are perspective views of a portion of the lower part and upper part of the strut, the front portion of the strut and wing, showing the interlocking, knock-down joint between the two parts of the strut and the attachment between the strut and wings.

Figure 45 is a perspective view of the lock bar notched to give flexibility.

Figure 46 is a detail view of the actuating mechanism for swinging the rudder.

Figure 46^A is a horizontal section on the line 46^Ax—46^Ax of Figure 46.

Figure 46^B is a diagrammatic perspective view of the connections and gearing for operating the rudder.

Figure 47:
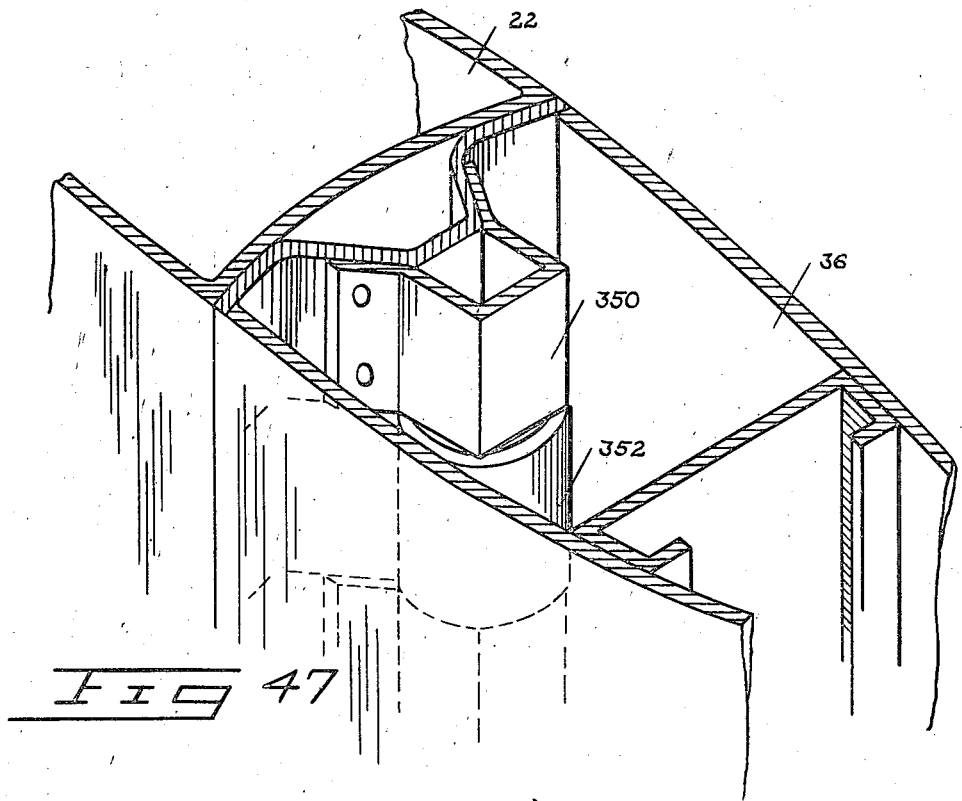

Figure 47 is a perspective view of a modified form of the elevator hinge as applied to the rudder.

Figure 48:
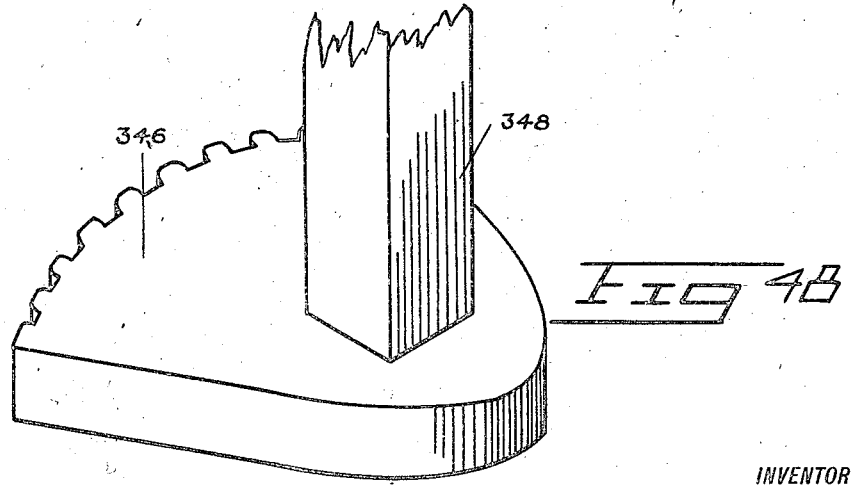

Figure 48 is a perspective view of the quadrant gear for driving the shaft in Figure 47.

Figure 49 is an end elevation of the beam shown in Figure 5 showing a modification of the beam.

Figure 50 is a section on the line 50^x—50^x of Figure 49.

Figure 51 is a detail of the apparatus used for making a countersunk riveted joint.

Figure 52 is a detail view of a countersunk riveted joint.

Figure 53 is a detail view of a header strip that can be used between a strut and a wing or any similar joint.

In the drawings, like reference numerals indicate like parts.

In the drawings, reference numeral 1 indicates the nacelle or dory of the flying machine supported on and built into the lower wing 2 and carried between the lower wing 2 and the upper wing 3. The lower and the upper wings are connected by the end struts 4, 4, only one of which is shown in Fig. 3, and by the Y struts 5, 6, 7 and 8, it being understood that the Y struts 5 and 6 are joined by the body 15 and the body strut 9, and the Y struts 7 and 8 are joined by the body 16 and the body strut 10 to the lower wing. Below the body struts are carried the wheel housings 11 and 12 in which are mounted the wheels 13 and 14 which support the forward end of the plane when on the ground. Extending rearwardly from the body struts and above them are the cylindrical bodies 15 and 16, which bodies connect the tail set to the main planes. Extending forward from the body struts are the engine foundations 15^A and 16^A. The cylindrical bodies 15 and 16 are connected by the bar wing 17 at a point intermediate to the main planes and the tail set.

The tail set comprises the lower plane 18 and an upper plane 19, which planes are connected by the struts 20, 21 and 22. Swiveled under the lower plane of the tail set at the central part thereof is the wheel housing 23 containing the trailer wheel 24 which supports the rear end of the plane when resting on the ground. In the cylindrical bodies 15 and 16 are provided three seats in each body, the seats being numbered 25, 26, 27, 28, 29 and 30. In the nacelle are provided the seats 31 and 32 for the pilots. On the main wings at the outer ends are provided the ailerons or wing flaps 33 and 34, the ones at the left being shown and the ones at the right being broken away in Figs. 2 and 3. In the tail set on the upper wing 19 is provided the elevator 35 extending the full length of the wing and on the struts 20 and 22 are provided the rudders 36 and 37.

Heretofore flying machines have been built up of wood, wire and fabric cover. The wood is used to form the rigid structure and the wire is used for trussing the wood members together into the form of an airplane. The wood structure is then covered with the cloth fabric although in some instances laminated wood has been used for part or all of the covering, and has also been used in the structure. Cloth fabric has been used to cover the planes and to receive the air resistances and reactions developed by velocity on the fabric and to transmit these forces thru the wood and wire members of the planes to the entire machine.

My invention consists broadly in the substitution of sheet metal for wood, wire and cloth and in a combination of the particular forms and shapes, made of sheet metal, into an airplane structure in which the requisite lightness, strength, stiffness and flexibility is secured in the structure whereby the diffused sustaining forces of the air are received on the planes and transmitted thruout the entire machine in such a manner as to sustain the weight and load of the machine without permitting the necessary sustaining and controlling forces of the air to localize in any part of the structure to an intensity or degree approaching the fibre strength of the metal used in making the planes.

This improvement is secured by building the airplane structure by the so-called "cellular" method, using members constructed of sheets of metal of light gage which puts the strength of the plane largely in the surfaces that are exposed to the air currents and air resistances which surfaces are remote from the neutral axes of the members and in the immediate supports that sustain these surfaces which supports consist of beams that occur at frequent intervals and give longitudinal stiffness to the wings so that the stresses are diffused thruout the structure and are dissipated by attenuation. By the box girder, cellular method of construction the members of the structure are so disposed that the structure tends to diffuse the stresses to which it is subjected to distribute and dissipate them without permitting the forces acting to concentrate or localize to any greater degree than when they are generated in and received by the structure from the air forces and wind gusts.

The use of light gage sheets disposed as they are by the cellular method in the surfaces and supports therefor, keeps the forces diffused and prevents them from localizing stresses at any point in the structure to any intensity that approaches the fibre strength of the material. Air currents and wind gusts are diffused in their nature and cannot set up sharp impact or heavy stress in the structure unless they are permitted to do so by the design.

As airplanes are built today, the forces that effect the airplane structure are led to relatively heavy struts and heavy spars, few in number. The stresses on the struts are concentrated in the strut heads and fittings for transmission and absorption. This concentration of the forces develop stresses that are fatal.

The construction by which the body members, struts and wings of my flying machine is built up, will now be described.

*Plane or aerofoil structure.*

The upper forward plane 3 is shown at the top of Fig. 6 and will now be described.

This plane 3 contains 12 beams which run the full length of the wing from one end to the other, or from tip to tip.

The first of these beams 40 has its flanges extending rearward and diverging to fit the outline or contour of the leading edge of the plane. To the left of the beam is placed the leading edge 41 which is made of a single piece of sheet metal bent to the required form and riveted or fastened to the top and bottom of the beam 40. The remaining beams 42, 43, 44, 45, 46, 47, 48, 49, 50, 51 and 52 are set in a form and covered with the top and bottom plates 53 and 54, which plates are joined to the flanges by rivets or other suitable fastenings, and to each other at the trailing edge. The plates 53 and 54 overlap the flanges of the beam 40 and the plate which forms the leading edge 41 so that all of the parts are firmly fastened together into one integral structure and in the correct position or relation to each other for the entire wing. The top and bottom plates 53 and 54 hold the beams properly spaced apart and in the proper relation to each other to maintain the form desired. The plates, however, are supplemented by certain reinforcing strips or exterior ribs 55 placed at suitable intervals and also by the struts which are attached thereto. The beams are shown in detail in Figs. 18 and 19 in which figures beam 42 is illustrated, it being understood that the other beams are substantially similar thereto. The beams are perforated at frequent intervals with flanged openings 56, which openings reduce the weight and the flanges 57 surrounding the openings increase the stiffness of the beam. The last beam in the plane is Z-shaped as shown at 52 (Figs. 6 and 17). The beams 51 and 52 (Fig. 6) are not perforated because of their narrow width.

The total length of a plane or aerofoil is about 50 ft. The beams extend the whole length of the plane. The strips from which the beams are formed, are about 8 ft. in length and the beams are formed in sections of 8 ft. and the sections of these beams are placed together end to end in a butt joint and are joined together by an overlapping beam section 58 placed on the back of the two sections at and overlapping the butt joint and conforming thereto and fitting closely therewith. See Figs. 16 and 17. The cover plates 53 and 54 are laid on in strips about 9 inches wide, extending from the leading edge to the trailing edge and overlap in a suitable direction. This gives access to the flanges of the beams for the purpose of riveting thereto as the strips are laid on and riveted one at a time. In riveting the leading ledge to the flanges of the beam 40, the flanges are exposed the whole length until the riveting is completed. The leading edge is preferably made of heavier material than the cover plates. Heavier gages of metal are used in the beams and the covers of the intermediate parts of the wings or planes and lighter gages are used in the parts as they approach the ends or tips of the wings. In this way, in the successive zones, the strength of the parts can be nicely proportioned to the stresses to which they are subjected. At the wing ends the beams taper off from beneath to the top camber in the same manner as is shown at the right in Figure 11 for the bottom wing of the tail set where on top of the plane or wing is sketched the elevation of the beam ends contained inside of the plane at the points indicated. This permits the top and bottom plates to come together in a thin edge on the top camber as shown in Figure 12. The thin ends of the wings are made flexible in this way.

The wings of the tail set are built up as is shown in Fig. 11, the beams of the lower wing of the tail set being shown in sectional elevation in Fig. 13 where thy are numbered 59, 60, 61, 62, 63, 64, 65, 66, 67, 68, 69, 70 and 71 and jointed together by the plates 72 and 73 and covered at the forward edge by the leading edge 74. The top plane of the tail set is shown in section at the top of Fig. 8 and is made up of the beams 75, 76, 77, 78, 79, 80 and 81, which beams are covered by the top and bottom plates 82 and 83 and the forward edge is covered by the leading edge 84.

The back edge of the wing where the elevator is attached, is closed by the beam 81 and the hinge strip 85. The hinge strip 85 carries a bearing 86 (see Figs. 30 and 31) which is cut away at regular intervals at 87 to receive the corresponding parts 88 on the hinge strip 90 that stand in line with the bearings 86, the two parts being fastened together by a pin 30ᴬ which passes thru the bearings and permits rotation of about 50° between the two parts of the hinge. The hinge strip 85 has radial sides which diverge from the bearing at a small angle and are then bent to form concave flanges on the diverging sides, the flanges being then bent back to lines parallel with and attached to the top and bottom of the plane. The hinge strip 90 also has radial sides which diverge from the bearing at a greater angle and are then bent to form convex flanges, the flanges being then bent back parallel with and attached to the top and bottom of the elevator. The hinge strip 90 supports the elevator 91 and swings with it. The elevator or rear portion of the plane is closed at its forward edge by the hinge strip 90 and carries the beams 92, 93 and 94 covered by the plates 95 and 96, which plates join to the hinge strip 90. These plates are reinforced fore and aft by the fins 97 and 98, which are placed at frequent intervals, these fins consisting of any suitable form of strips.

The ailerons or wing flaps are mounted on the front main wings in substantially the same manner as the elevators are attached to the tail set, the cross section of the wing and the aileron being substantially the same in cross section as the tail wing and the elevator at the top of Fig. 8 except that the section of the main wing in advance of the hinge joint conforms substantially to the section at the top of Fig. 6. The outer ends of the elevator and of the aileron taper off in substantially the same manner as is shown at the right hand of Fig. 11 and by the use of a similar construction. The end or tip of the aileron 33 will terminate in a thin edge as shown in Fig. 12, and will have a camber corresponding to the top surface of the plane shown at the top of Fig. 6.

This hinge applied to the elevator or aileron provides a practical method of constructing an airplane wing or aerofoil which has all the benefits that are to be derived from varying the camber of the aerofoil or wing at will because it avoids breaking the continuity between the rigid and movable parts of the plane on both the top and bottom surfaces even while the machine is in flight.

Struts.

The construction of the struts and the connection between them and the structure of the machine will now be described.

The struts 4, 5, 6, 7, 8, etc., are of stream line formation or outline. The strut 4 is shown in cross section in Fig. 7 and is formed by the beams 103, 104, 105, 106, 107, 108 and 109. These beams are fastened together by the cover plates 110 and 111 which can be made in a single piece and extend clear around the strut. The cover plates are preferably put on in strips of about 9 inches in width for convenience in riveting or fastening, each strip connecting to all the beams.

The beams of the struts are attached to the beams of the wings as shown in Fig. 32. The back of the beam 105 is extended and overlaps the back of the beam 45 in the lower wing, which beam corresponds to beam 45 in the upper wing, to which beam the upper end of the strut beam 105 is attached in the same way. The sides or flanges of the beam 105 are turned out at right angles to overlap the sides or flanges of the beam 45ᴬ as shown at 105ᴬ, and the beams are riveted together at the overlapped joints both at the top and bottom. Between the beams of the struts near the ends thereof and beams in the wings are placed the braces 45^C and 45^D which braces are L-shaped in cross section. These braces are riveted to the backs of the strut and wing beams at any suitable angle to develop the form of the boles or expanded portion of the struts at the ends where they blend into the wings. To distribute the strain on the beam 105 from the braces 45^C and 45^D, the reinforce 105^B is provided which consists of a short beam about 6 inches long that is inserted in the beam 105 and riveted thereto so that 4 inches are above the joint and 2 inches are below the joint as shown in Fig. 32.

The same method of attachment and bracing is used for connecting all strut ends that make right angle joints or connections. The diagonal braces are covered with a suitable, inclined cover plate which may be curved and fitted to make a smooth connection between the surface of the strut and the surface of the wing or other member to which the strut is connected. See Fig. 35.

If desired, a header strip may be interposed between the beams of the strut and the beams of the wing, and such a construction is shown in Fig. 53 in which case numerals 43 and 44 represent beams of the lower wing on which is laid the header strip 125, which strip is riveted to the flanges of the beams 43, 44, etc., of the wing. The header strip has flanges 126 and 127 which are turned down between the beams or cut away at the beams. The strut beams abut against the header strip and the end of the back of the strut beam is turned out to form a flange that overlaps and is riveted to the header strip and the ends of the flanges are turned out to form flanges that overlap the flanges of the wing beams to which they are riveted.

The rudders 36 and 37 are hinged on the struts 20 and 22 by the hinge joints as are shown in Figs. 46, 47 and 48. The rudders are made up of beams and cover plate put together as shown in cross section in Fig. 46^A, it being substantially the same way as is shown in the elevator in Fig. 8, except that they are symmetrical in cross section while the elevator is not symmetrical in cross section.

Wheel housing.

The machine, while resting on the ground, is supported by wheels 13, 14 and 24. The wheels 13 and 14 are carried in the wheel housings 11 and 12 which are stationary and the wheel 24 is carried in the wheel housing 23 which is swiveled. The stationary wheel housing for one of the front wheels will now be described. (See Figs. 23, 24, 25 and 33.)

The wheel 13 is mounted on an axle 200 which extends loosely thru the hub of the wheel, the wheel preferably having resilient spokes. The wheel also has a pneumatic tire. The hub of the wheel has a collar 201 which thrusts against a thrust bearing plate 202 which is about nine inches long and five inches wide and is intended to distribute the end thrust of the hub over the beams of the wheel housing. This plate 202 moves up and down and sideways with the axle 200. The axle 200 extends thru a heavy plate 234 of the inner lining 203 of the housing to the outer lining or the cover of the wheel housing.

At each end of the axle between the inner lining and outer cover 205 is placed a box of heavy sheet material, this box containing rubber or other resilient material. (See Figs. 23 and 33.) This rubber is built up of layers into a solid block that fills the box. Each layer is perforated with an opening which may be round, square or triangular or other shape, which openings come in line with each other and are adapted to receive a sleeve 206 which forms a bearing for the end of the axle. In the plate 234 of the housing is cut an elongated slot 207 which extends upward and rearward, thru which the axle 200 extends into the rubber block. The end of the axle can rise and fall in this slot and move endwise therein with the sleeve 206 as the rubber in the box yields under impact so that the shock is taken up by the elasticity of the rubber in the box and is distributed to the beams bearing against the box. The lining 203 and the outer cover 205 support the channels 208, 208. On these channels rests the bottom plate 209. On this plate rest the side plates 210 and 211 having flanged edges all around. On the top of these plates rests the top plate 212.

The plates 209, 210, 211 and 212 and the inner and outer casings constitute the box that contains the rubber block that is used as a shock absorber. The outer housing 205 is provided with an opening thru which the rubber may be inserted and this opening is closed by the sliding door 213. The beams 214, 215, 216 and 217 rest with their ends on the plate 209 and are attached to the inner lining and extend upwardly to the beams in the lower wing. The beams 218 and 219 are attached to the sides of the box and are attached to the inner lining and the outer cover and extend up to the beams in the wing. Beams 220, 221, 222, 223, 224, 225 and 226 rest on the top plate 212 and are connected to the inner lining and the outer cover and extend up to the beams in the lower wing. By means of these beams the downward thrust of the machine is communicated thru the block of rubber to the axle of the wheel and the reaction of the wheel is distributed thru them to the structure and diffused thruout the structure. Beams 227, 228 and 229 connect the inner lining and outer cover and space them apart at the front giving them proper form and beams 230 and 231 connect the inner lining and outer cover at the rear and give it proper form. At the front the leading edge of the outer casing of the wheel housing is connected to the beam 232 while the trailing edges of the cover are connected to the beam 233 and to each other. The inner lining is provided with a heavy plate 234 above referred to rectangular in shape which covers and is attached to all the beams that take up and distribute the shock and the balance of the inner lining is a thin shell attached thereto that extends up to the lower wing and extends around in front of and behind the wheel and over it and acts as a mud guard making substantially a rectangular opening in which the wheel revolves. Connected to the upright beams of the wheel housings are the diagonal braces 235, which braces go up to beams in the lower wings and brace the housings laterally.

The foregoing description describes both of the front wheels and housings. The trailing wheel and its housing is similar thereto except that the top of the housing is covered with the annular bottom plate 236 of the turn table, on the under side of which is carried horizontal beams to which the upper ends of the upright beams in the housing are connected, terminating therewith. (See Figs. 20, 21 and 22.) An annular flange 237 surrounds the lower plate of the turn table with the flange extending downwardly and the diagonal braces 235 are attached thereto and the horizontal beams at their upper ends.

The upper plate 238 of the turn table is attached to the bottom of the lower wing (see Figs. 8 and 13) and has a flange 239 projecting downward from the edge thereof and fits closely with the outside of the flange 237 on the turn table of the wheel housing. At the center of the turn table a square plate or washer is fastened to the beams of the lower wing on the upper side and another plate is fastened to the beams at the top of the wheel housing on the under side. (See Figs. 11, 13 and 22.) The two parts of the turn table are fastened together by the king bolt 240 which passes through these plates holds the turn table in place and permits it to turn under the tail set. The axle of the wheel is set about four inches behind the center of the turn table so as to make the wheel properly trail.

Controls.

In the nacelle are mounted the hollow rocker shafts 301 and 302 connected by the yoke 303. Pivotally mounted on the yoke is the Joy-stick 304. (See Figs. 26, 28, 29 and 37.) The lower end of the Joy-stick has a quadrant 304^A thereon that engages with a rack 305^A mounted on the square shaft or link 305. The yoke 303 has square openings in the ends thereof in which the shaft 305 slides and by which the rack 305^A is held in line with the quadrant 304^A. As the pilot pulls the Joy-stick toward him or pushes it away from him, both the inner and outer shafts rock together. As he moves the Joy-stick to the right or the left, he moves the inner shaft 305 longitudinally while the outer shaft 302 remains stationary. The longitudinal movements of the inner shaft 305 is utilized to control the movement of the wing flaps or ailerons 33 and 34 (see Figs. 2, 28 and 37), and the rocking movement of the outer shaft 301 and 302 is used to secure the raising or lowering of the elevator 35 by mechanism that will now be described. See Figs. 2, 28 and 29.

Figure 1:
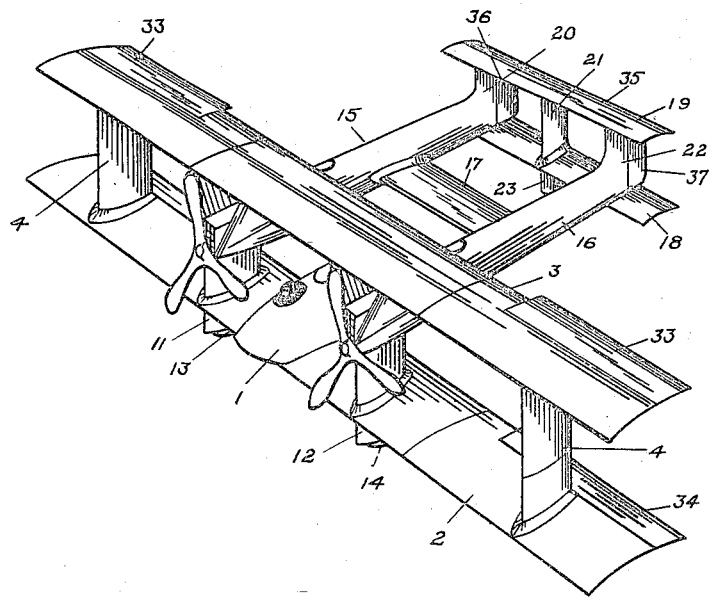
Figure 1 is a perspective view of the machine.

On the hollow shaft 302 is the quadrant 306 which meshes with the rack 307, which rack extends upwardly thru the body strut to an elongated pinion 308 in the cylindrical body member and near the bottom of it. With this pinion engages a rack 309 that extends thru the cylindrical body member to an elongated pinion 310 in the strut 22 in the tail set. This rack 309 is divided and the two halves of it are connected by a turnbuckle 311 by which they can be adjusted. Extending upwardly thru the strut 22 is the rack 312 which meshes with the elongated pinion 310 at its lower end and drives the quadrant 313 at the upper end. This quadrant is integral with the elevator 35 and thru it the elevator 35 is rocked by the movement of the Joy-stick forward and back. The shaft 301 drives a similar train of gearing that connects to a similar quadrant in the strut 20 (Figs. 1, 2 and 5) at the other end of the elevator so that the elevator is moved evenly at both ends.

The movement of the Joy-stick to the right or left moves the square inner shaft 305 endwise as above described. The shaft 305 in turn moves the shafts 314 longitudinally that are in line therewith without turning them due to the fact that the shafts 314 are swiveled on the shaft 305 as will now be described.

At each end of the hollow shaft 305 is inserted a plug, the stem of each plug being pinned thru the shaft. (See Fig. 36.) The outer end of the plug is enlarged and threaded. The shafts 314 are supported in line with the shaft 305 and are held in line therewith by swivel joints. The inner end of each shaft 314 is provided with a plug 314^A, the stem of which is pinned in the shaft, the plug having an enlarged, cylindrical head which is left smooth. The hexagon nut 315 such as is ordinarily used in a pipe coupling, is slipped over the shaft 314 and engages with the threaded plug in the shaft 305 and pinned thereto in the proper position. By these joints the shafts 314 are swiveled on the intermediate shaft 305 and thru these joints the shafts 314 are moved longitudinally by the side movement of the Joy-stick but are not rocked when the Joy-stick is moved toward and from the pilot. The shaft 314 carries a rack that engages with an elongated pin 316 that in turn drives the vertical rack bar that at its upper and lower ends engages with the quadrants on the ailerons or wing flaps 33 and 34. As the Joy-stick is moved to the left by the operator, the rack bar 317 is pulled down and the wing flaps on one side are raised. The mechanism is arranged to move the wing flaps on the other side in the opposite direction.

A second Joy-stick 304$^B$ is provided which is coupled to the Joy-stick 304 by a shaft 320. The movement of the Joy-stick 304 forward and back and sideways causes a corresponding movement in the Joy-stick 304$^B$, which is pivotally mounted on a swinging support 303$^A$. The machine can be operated from either Joy-stick. The experienced pilot sits in the rear seat and the beginner in the front seat and the beginner moves his Joy-stick 304$^B$ under the control of the pilot. Sometimes it is necessary for the pilot to take the exclusive control of the machine and eliminate the beginner from interfering therewith. For this purpose, a ready means for disconnecting the Joy-stick 304$^B$ from the control mechanism is provided as follows:

The shaft 320 comprises a wooden bar having a strap 321 on the end thereof. This strap engages a bolt 322 that passes thru the hub of the Joy-stick at right angles to the axis 323 on which the Joy-stick turns. (See Figs. 27 and 27$^A$.) The strap 321 engages this bolt on each side of the Joy-stick. A cotter pin 324 passes thru both the strap 321 and bolt 322 and holds them together. This cotter pin is connected to the end of the bolt by a chain 325 by which both the cotter pin 324 and the bolt 322 may be pulled out in the order named. When the bolt 322 is pulled out, the strap 321 is disengaged from the Joy-stick and the shaft 320 will then drop down out of engagement with the rear Joy-stick and leave the rear Joy-stick alone in control of the machine.

The rudder mechanism illustrated in Figs. 26, 27, 46, 46$^A$, 46$^B$, 47 and 48, is operated as follows:

Pivotally mounted on the floor of the nacelle are the levers 330 and 331. These levers are connected by the links 332 and 333 so that they will operate in unison for the purpose of moving the rudder from either seat. Connected to the lever 330 is the quadrant 334 which operates the rack bar 335. The rack bar 335 moves longitudinally and at each end engages the elongated pinions 336 and 337. This rack bar is located between two of the beams in the lower wing.

The pinions 336 and 337 engage with the vertical rack bars 338 and 339 which are located in the struts 9 and 10 and engage with the elongated pinions 340, 340, which in turn engage with the rack bar 342, 342, that extend thru the bodies 15 and 16 to elongated pinions 344, 344, at the rear. These pinions engage with quadrants 346 on the square shaft 348, which square shaft engages with the square sleeves 350 integral with the rudder 37. Intermediate the square sleeves 350 are the round sleeves 352 which are attached to the strut 22, the square shaft 348 turning loosely in said sleeves.

It will be understood that a similar train of mechanism consisting of pinions, rack bars, quadrants, etc., connects to the rudder 37 so that both of these rudders are operated together.

*Engine foundation.*

The engine foundation will now be described as follows:

The engine and foundation are shown in Figures 41, 41$^A$, 42 and 42$^A$. The engine has the crank case, the upper half of which is indicated at 400 and the lower half at 401. The halves of the crank case are held together by the flanges 402 and 403. These flanges on each side are supported by two skids. The upper wooden skid 404 is about 2 inches wide, 1½ inches high and 30 inches long. The lower skid 409 is about 3 inches wide, 1½ inches high and 44 inches long. The lower skid rests upon the upper ends of a series of upright beams 405 which are spaced about 1½ inches between centers, these beams being about 3 inches wide. These upright beams are attached to and supported by the horizontal beams in the lower wing. As there are about four times as many upright beams in the engine foundation per foot as there are horizontal beams in the lower wing, it is necessary to increase locally the number of beams in the lower wing over those shown at the bottom of Fig. 6 where the beams are spaced about 6 inches between centers. For this purpose, three extra beams are inserted between each two regular beams, the extra beams being about 41½ inches long, it being understood that the engine foundations in this instance are spaced about 11½ inches apart and the engine foundations are about 3 inches wide and the extra beams extend about 12 inches on each side of the engine foundation. The ends of these extra beams are fastened to the cover plates of the wings both above and below, by which they are firmly held in position. The main beams 42, 43 and 44 are indicated in Figs. 6 and 41 and the extra beams are indicated as 42$^B$ and 42$^C$, 43$^A$, 43$^B$ and 43$^C$, etc., in Fig. 41 only. In each foundation the upright beams are indicated by the reference numeral 405, it being understood that these beams are spaced 1½ inches between centers and are about 4 ft. high. They are held together and suitably spaced apart by cover plates 406 and 407, which are riveted to the sides thereof.

At the top the upright beams have the web turned over to the horizontal to form a flange. To these flanges is riveted a plate 408, which plate is bent upwardly and has the ends of the cover plates 406 and 407 riveted thereto. The plate 408 is used as an envelope plate for the skid 409. The cover plate 408 is bent over the top of the skid 409, the abutting edges being tacked down thereon. On top of the skid 409 is placed three plates 410, 411, and 412, one of which is of steel and two of aluminum. These three plates are fastened to the upper skid 404 by the screws 414 and the outer edges of the laminated plates are fastened to the skid 409 by the lag screws 413. The flanges 402 and 403 of the crank case of the engine rest on the upper skid 404 and the bolts 415 pass thru the two skids and the laminated plates and thru the flanges and fasten all of the parts together. Opposite the heads of each of these bolts, the cover plate is cut away with an opening 1 in. wide and 1½ in. high as indicated at 416 so that the bolts may be inserted between the vertical beams and pass thru the skids and the plates.

In Fig. 42 I have also shown a section of the body which is built up of the longitudinal beams 420 that are joined together by the cover plates 421 and 422. The Y struts 7 and 8 with their beams and covers connect onto the body with the usual joints described elsewhere. The body is braced inside, below the Y struts by the beams 423 and 424 which run parallel to the engine foundation.

*Brake mechanism.*

For the purpose of stopping the machine and shock absorber when landing and to damp the violent vibration of the plane due to the resilient landing gear, I provide a brake mechanism acting on the two front wheels. The brake mechanism is illustrated in Figs. 23, 24, 25, 26, 27 and 34. Mounted on either side of the wheel 13 are the brake shoes 450 and 451. On each end of these brake shoes are formed blocks 452, 453, 454, etc. One of the blocks on the shoe 451 is broken away in Fig. 34. These blocks slide toward and away from the wheel in boxes 455 and 456, mounted in the plate 234, by which they are supported. The intermediate part of each shoe is beveled as shown in Fig. 34. Co-operating with each of the brake shoes are the wedges 457 and 458, which wedges move vertically between the brake shoe and the plate 234 and engage with the beveled part of the brake shoe, pressing them in against the sides of the wheels as the wedges are moved down and permitting them to move out as the wedges are drawn up. Each of the wedges is connected to the links 459 and 460, which links are connected to a crank 461, carried on a shaft 462 pivotally mounted in the wing 2, on which shaft is provided a handle 463 by which the wedges may be operated for the purpose of setting up the brake shoes. To the bar 463 is connected a link 464 that in turn connects with the lever 465 pivotally mounted at 466 in front of the front seat, the lever 463 being pivotally mounted in front of the rear seat. The spring 467 is provided, by which the levers are drawn normally forward to release the brake mechanism. By this mechanism, the brakes may be set and released as may be desired by the operator.

As the machine lands and is slowed up by the brakes, the shock of the impact and the vibration of the planes are taken up by the resiliency of the wheels, (the wheels having spring spokes), and tires and axles and the rubber cushions surrounding the ends of the axles 200 and the shock box or casing surrounding the rubber. The stresses are then distributed thru the beams attached to the box (26 beams or thereabouts to each wheel, with the bole braces and covers and linings of these beams), and are diffused thruout the lower wing and directly thru this structure upward into the body strut beams, bole braces and cover, and thru them into the body structure upward into the beams of the engine foundation and thru the Y struts into the top plane. Thru this structure the brakes and cushions all co-operate to make the landing safely, and bring the machine to a stop quickly without injury to the machine or passengers.

*Knock-down joints.*

To facilitate the transportation and handling of the plane, several parts of it are made detachable so that it may be knocked down. Such parts are shown in Figs. 38, 39 and 40 where a knock-down joint in one of the wings is shown and in Figs. 43, 44 and 45 where a knock-down joint in one of the struts is shown. The knock-down joints in the upper and lower wings occur at 501 and 502 and in the struts 4, 4, at 503. At these points the outer portions of the wings will be detached from the intermediate portions and from each other by suitable joints in the planes and struts.

For this purpose, at the ends of the beams in the intermediate sections and the end sections, the web is turned back and the flanges are turned down or up to form new flanges 504, 505 and 506 that can be riveted to the header or end plate 507 that extends across the ends of all the beams. In the end sections similar flanges are formed on the beams and are riveted to the header or end plates 508. The headers 507 and 508 have large holes therein to make them lighter and to give access to the flanges 504 so that the rivets therein may be worked from both sides. The cover plate 54 is turned down to form a flange that can also be riveted to the end plates. When the end section of the plane is assembled with the intermediate part, the plates 507 and 508 are brought together. These plates interlock with each other and are fastened together as follows:

The edges of the header plate 507 has recesses 509 cut therein which receive teeth 510 formed on the edges of the header plate 508 and by this device, the plates are interlocked and lateral movement of the one plate on the other is prevented. The sections are held together at the top by the channel 511 which channel is riveted to the plate 508. The sections are brought together with the headers in contact at the top, the top of the plate 507 being inserted up under the channel, the two plates 507 and 508 being then brought together at the bottom. At the bottom the sections are then fastened together by the lock bar 512 which is C-shaped in cross section. On one side of the header flanges at the top is placed a steel strip 513 and on both sides of the header flanges at the bottom are placed the steel strips 514 which protect and reinforce the flanges. The lock bar 512 is put on by sliding it on endwise and has sufficient spring and stiffness in it to securely hold the parts together.

In the same manner, the sections of the struts are fastened together. The ends of the sections of the struts are closed by the header plates 515 and 516, which are fastened to the beams and cover plates in the same manner as is shown in Figs. 38, 39 and 40. The edges of the header plates are notched or recessed, the upper plate 516 being provided with teeth which extend down to engage in the recesses of the lower plate 515 to interlock therewith. The lock bar 517 is then slipped over the flanges endwise. To enable it to bend around the curve, the lock bar is notched from the edges inwardly and cut away enough at the notches to enable it to bend inwardly. In this way the sections of the struts are locked together.

Riveting and embossing.

The rivets used in fastening the plates together may be countersunk and the plates may be embossed as follows:

In Fig. 51 I have shown a section of the cover and beam with a rivet in position for heading up. Below the plates I place an anvil block 530 having a cone shaped recess therein. This recess is placed below the rivet and the rivet is hammered down into it until it heads up below. As the upper head of the rivet sinks down, it carries the plates with it and stretches them and embosses them until it makes a countersunk opening which receives and surrounds the head of the rivet as shown in Fig. 52. This embossing more securely fastens the plates together and assists the rivets to hold them together. When the aluminum plates are used, they may be easily driven together and bent to the shape desired to secure the embossed effect. When steel plates are used, the result may be secured by heating the plates locally in any desired way and then driving the rivet.

Modified beam structure.

In Figs. 49 and 50 I have shown details of a modified form of beam. In this case I use a channel 540 at the top and bottom of the beams 541. In these channels I place a serpentine web 542, the margin of which engages the sides of the channel. These parts are made of steel and the contacts between the web and channels are soldered by dipping or in any other suitable way. The web and channels are thus securely fastened together at all points of contact and a light, strong, rigid beam is thus secured. The serpentine web should be made of light gage and the channels of heavier gage sheet metal to get the greatest strength in the beam with the least weight.

I claim:

1. A plane for a flying machine made up of a series of metal beams of graduated sizes to give the correct thickness to the plane, a leading edge bent up of sheet metal attached to the forward beam at the top and bottom thereof, cover strips running across the top and bottom of said beams and connecting them together.

2. A flying machine having planes and struts made of cover plates of sheet metal and channel shaped beams bent from sheet metal joined together in box girders having the desired outline.

3. A biplane having an upper and lower plane made of cover plates of sheet metal and channel shaped beams bent from sheet metal joined together in box girders having the desired outline, four struts connected to the lower plane by which said lower plane is fastened to the upper plane said struts being formed of cover plates of sheet metal and channel shaped beams bent from sheet metal.

4. A biplane having an upper and lower plane, each plane having channel shaped beams formed of sheet metal running the length thereof and spaced at frequent intervals, similar beams extending vertically and connecting the beams of the two planes, said vertical beams being arranged in the form of a strut, metal cover plates connecting said beams.

5. A flying machine having a plane having channel shaped beams, flanges running the length thereof formed of sheet metal, similar beams extending vertically therefrom, metal cover plates connecting said beams, a body connected to said plane by said vertically extending beams.

6. A plane for a flying machine made up of a series of channel shaped beams bent from sheet metal, a leading edge placed in advance of the forward beam, said leading edge being formed of a single sheet of metal bent to form a valley, the sides of the leading edge being fastened to the flanges of the forward beam, metal cover plates connecting said beams.

7. A plane for a flying machine made up of a series of channel shaped beams bent from sheet metal, a metal cover plate connecting said beams on top and a metal cover plate connecting said beams on the bottom, the lower edge of said beams inclining upwardly toward the end of the plane allowing the cover plates to come together to an edge on the top camber of the plane.

8. A flying machine having a plane made up of a series of metal beams running lengthwise of the plane, Y-shaped struts connected to the beams of the plane and extending downwardly therefrom, the members of said struts joining together below the plane said struts extending transversely of the plane.

9. A plane for a flying machine made up of a series of channel shaped beams formed of sheet metal, a cover plate connecting said beams on top and a cover plate connecting said beams on the bottom, said cover plates being laid on in a series of narrow plates running transversely to the beams and fastened thereto, said cover plates overlapping each other, said cover plates holding the beams properly spaced apart and in the correct relation to each other.

10. A plane for a flying machine made up of a series of metal beams, a cover plate connecting said beams on top and a cover plate connecting said beams on the bottom, said cover plate being laid on in a series of narrow plates running transversely to the beams and fastened thereto, said cover plates overlapping each other, said cover plates holding the beams properly spaced apart and in the correct relation to each other, reinforcing strips attached to said cover plates and extending substantially at right angles thereto.

11. A plane for a flying machine made up of a series of metal beams, a cover plate connecting said beams on top and a cover plate connecting said beams on the bottom, said plane being closed at the back by a beam, a hinge strip attached thereto, an elevator, a hinge strip on the forward edge thereof, each of said strips being cut away at intervals to receive a corresponding part of the other strip, bearings in said strips, a pin which passes thru said strips and holds them together and permits the rotation of the one on the other.

12. A plane for a flying machine made up of a series of metal beams, a cover plate connecting said beams on top and a cover plate connecting said beams on the bottom, said plane being closed at the back by a beam, a hinge strip attached thereto, an elevator, a hinge strip on the forward edge thereof, each of said strips being cut away at intervals to receive a corresponding part of the other strip, bearings in said strips, a pin which passes thru said strips and holds them together and permits the rotation of the one on the other, one of said hinge strips having radial sides diverging at a small angle and concave flanges thereon and the other strip having radial sides diverging at a larger angle and convex flanges thereon, the one strip being movable on the other at an angle equal to the difference between the two angles.

13. In a flying machine a plane and an elevator and a hinge connecting them, said hinge having a strip on the plane and a strip on the elevator, each strip being bent to form a bearing and being cut away at intervals to receive a corresponding part on the other strip, a pin which passes thru the bearings and holds the strips together, one of said strips having radial sides diverging from the bearing at a small angle and concave flanges thereon, the other strip having radial sides diverging from the bearing at a larger angle and convex flanges thereon, the one strip being movable on the other at an angle equal to the difference between the two angles.

14. An elevator having parallel channel shaped beams formed of sheet metal running the length thereof and cover plates extending transversely of the beams and connecting them together, a hinge strip closing the forward end of the elevator and attached to the cover plate.

15. An aileron having parallel channel shaped beams formed of sheet metal running the length thereof and cover plates extending transversely of the beams and connecting them together, a hinge strip closing the forward end of the aileron and attached to the cover plate.

16. In a flying machine, a hinge comprising a stationary strip supporting a bearing. radial sides diverging from said bearing at a small angle, concave flanges extending outwardly therefrom, means for fastening said flanges to the plane.

17. In a flying machine, a hinge comprising a moving strip supporting a bearing, radial sides diverging from said bearing at a large angle, convex flanges extending outwardly therefrom, means for fastening said flanges to the swinging parts of the plane.

18. In a flying machine, a hinge comprising a stationary strip supporting a bearing, radial sides diverging from said bearing at a small angle, concave flanges extending outwardly therefrom, parallel flanges extending forwardly therefrom and adapted to be fastened to a beam of the rigid part of the plane.

19. In a flying machine, a hinge comprising a moving strip supporting a bearing, radial sides, diverging from said bearing, at a large angle, convex flanges extending outwardly therefrom, parallel flanges extending rearwardly therefrom and adapted to be fastened to a beam of the swinging part of the plane.

20. In a flying machine, a hinge comprising a stationary strip supporting a bearing, radial sides diverging from said bearing at a small angle, concave flanges extending outwardly therefrom, a moving strip supporting a bearing, radial sides diverging from said bearing at a large angle, convex flanges extending and holding the two parts together, said bearings and sides being cut away at suitable places to permit engagement between the two strips.

21. In a flying machine, a rudder having square sleeves fastened therein, suitably spaced apart, a strut in front of said rudder, round sleeves fastened to the strut at intermediate points, a square shaft passing through both sets of sleeves, a quadrant on the end thereof for turning the shaft.

22. A strut for a flying machine having a series of parallel channel shaped beams formed of sheet metal, a metal cover plate extending on both sides of said beams and connecting them together, said strut having wide beams at the middle thereof and narrower beams toward the front and rear edges thereof.

23. A strut for a flying machine having a series of parallel channel shaped beams formed of sheet metal, a metal cover plate extending on both sides of said beams and connecting them together, said strut being symmetrically convex on both sides, being wide in the middle and narrow at both front and back, said strut having wide beams at the middle thereof and narrower beams toward the front and rear edges thereof.

24. A strut for a flying machine having a series of parallel channel shaped beams formed of sheet metal having webs and flanges, said beams overlapping corresponding beams extending longitudinally of the plane, the webs of the strut beams overlapping and being fastened to the backs of the plane beams.

25. A strut for a flying machine having a series of parallel channel shaped beams formed of sheet metal having webs and flanges, said beams overlapping corresponding beams extending longitudinally of the plane, the webs of the strut beams overlapping and being fastened to the backs of the plane beams, the flanges of the strut beams being turned at right angles and fastened to the flanges of the plane beams.

26. A strut for a flying machine having a series of parallel channel shaped beams formed of sheet metal having webs and flanges, said beams overlapping corresponding beams extending longitudinally of the plane, the webs of the strut beams overlapping and being fastened to the backs of the plane beams, diagonal braces connecting the strut beams to the plane beams.

27. A strut for a flying machine having a series of parallel channel shaped beams formed of sheet metal having webs and flanges, said beams being connected to corresponding beams extending longitudinally of the plane, the webs of the strut beams overlapping and being fastened to the back of the plane beams, diagonal braces connecting the strut beams to the plane beams, cover plates for the braces connected to the cover plates of the struts and planes.

28. A strut for a flying machine having a series of parallel channel shaped beams formed of sheet metal having webs and flanges, corresponding beams in the planes extending longitudinally thereof to which the strut beams are connected, cover plates for the strut and plane, diagonal braces connecting the strut beams to the plane beams, cover plates connected to the braces and connected to the cover plates of the struts and planes.

29. A strut for a flying machine having a series of parallel channel shaped beams formed of sheet metal having webs and flanges, said beams overlapping corresponding beams in the plane, the webs of the strut beams overlapping and being fastened to the backs of the plane beams, diagonal braces connecting the strut beams to the plane beams, a reinforce attached to the strut beam where the diagonal braces attach thereto.

30. A strut for a flying machine having a series of parallel channel shaped beams formed of sheet metal having webs and flanges, said beams overlapping corresponding beams in the plane, the webs of the strut beams overlapping and being fastened to the backs of the plane beams, diagonal braces connecting the strut beams to the plane beams, a reinforce attached to the strut beam where the diagonal braces attach thereto, said reinforce consisting of a short beam attached to the strut beam above and below the joint with the diagonal braces.

31. A strut for a flying machine having a series of parallel channel shaped beams formed of sheet metal having webs and flanges, said beams overlapping corresponding beams in the plane, the webs of the strut beams overlapping and being fastened to the backs of the plane beams, diagonal braces connecting the strut beams to the plane beams, a reinforce attached to the strut beams where the diagonal braces attach thereto, said reinforce consisting of a short beam attached to the strut beam above and below the joint with the diagonal braces, said reinforce being arched to clear the projection on the strut beam.

32. In a flying machine, a plane having a series of parallel beams held together by cover plates, a strut at an angle thereto, said strut having a series of parallel beams, the beams of the struts intersecting and overlapping the beams of the plane and being fastened thereto by cover plates, for holding the beams of the struts together, the cover plates of the struts tending to hold the beams and cover plates of the plane in correct alignment.

33. In a flying machine, a plane having a series of parallel beams held together by cover plates, a strut at an angle thereto, said strut having a series of parallel beams, the beams of the struts intersecting and overlapping the beams of the plane and being fastened thereto by cover plates, for holding the beams of the struts together, the cover plates of the plane tending to hold the beams of the strut in correct alignment.

34. In a flying machine, a strut built up of a series of parallel beams, held together by cover plates, said strut being divided by header plates into two sections, said plates having teeth that interlock with each other in a projecting flange, a lock bar engaging with said flange and locking said plates together.

35. In a flying machine, a wing built up of a series of parallel beams, held together by cover plates, said wing being divided by header plates into two sections, said plates having teeth that interlock with each other in a projecting flange, a lock bar engaging with said flange and locking said plates together.

36. In a flying machine, a wing built up of a series of parallel beams, held together by cover plates, said wing being divided by header plates into two sections, which plates form flanges on the top and bottom of the wing, a channel engaging said flanges on one side, said channel being fastened to one of said flanges.

37. In a flying machine, a wing built up of a series of parallel beams, held together by cover plates, said wing being divided by header plates into two sections, which header plates form flanges on the top and bottom of the wing, a lock bar engaging said flanges on one side.

38. In a flying machine, a wing built up of a series of parallel beams, held together by cover plates, said wing being divided by header plates into two sections, which header plates form flanges on the top and bottom of the wing, a channel engaging said flanges on one side, said channel being fastened to one of said flanges, a lock bar engaging said flanges on the other side.

39. In a flying machine, a wing built up of a series of parallel beams held together by cover plates, said wing being divided by header plates into two sections, which plates form flanges on the top and bottom of the wing, a channel engaging said flanges on one side, said channel being fastened to one of said flanges, a lock bar engaging said flanges on the other side, said header plates each having teeth on one side in one of the flanges, the teeth on one plate interlocking with the teeth on the other plate.

40. A plane for a flying machine made up of a series of metal beams, a cover plate connecting said beams on top and a cover plate connecting said beams on the bottom, said plane being closed at the back by a beam, a hinge strip attached thereto, an elevator, a hinge strip on the forward edge thereof, each of said strips being cut away at intervals to receive a corresponding part of the other strip, bearings in said strips, a pin which passes thru said strips and holds them together and permits the rotation of the one on the other, said hinge joint keeping the top and bottom surfaces of the rigid and movable parts practically continuous for all positions of the movable parts.

In testimony whereof I affix my signature.

MEDOREM W. GREER.